(12) United States Patent
Tada et al.

(10) Patent No.: US 7,047,238 B2
(45) Date of Patent: May 16, 2006

(54) DOCUMENT RETRIEVAL METHOD AND DOCUMENT RETRIEVAL SYSTEM

(75) Inventors: Katsumi Tada, Kawasaki (JP); Hisashi Takatori, Kyoto (JP)

(73) Assignees: Hitachi, Ltd., Tokyo (JP); Hitachi Systems & Services, Ltd., Tokyo (JP)

( * ) Notice: Subject to any disclaimer, the term of this patent is extended or adjusted under 35 U.S.C. 154(b) by 138 days.

(21) Appl. No.: 10/370,829

(22) Filed: Feb. 21, 2003

(65) Prior Publication Data

US 2004/0255218 A1  Dec. 16, 2004

(30) Foreign Application Priority Data

Feb. 21, 2002  (JP)  ............................. 2002-044109

(51) Int. Cl.
  G06F 17/30  (2006.01)
  G06K 9/03  (2006.01)
  G06K 9/72  (2006.01)
(52) U.S. Cl. .................. 707/5; 382/185; 382/220; 382/229; 382/310; 707/6
(58) Field of Classification Search .................. None
  See application file for complete search history.

(56) References Cited

U.S. PATENT DOCUMENTS

| | | | |
|---|---|---|---|
| 6,111,985 A * | 8/2000 | Hullender et al. | 382/229 |
| 6,154,579 A * | 11/2000 | Goldberg | 382/310 |
| 6,205,261 B1 * | 3/2001 | Goldberg | 382/310 |
| 6,219,453 B1 * | 4/2001 | Goldberg | 382/229 |
| 6,333,999 B1 * | 12/2001 | Brownsmith | 382/229 |
| 6,459,810 B1 * | 10/2002 | Cring | 382/229 |
| 6,546,383 B1 * | 4/2003 | Ogawa | 707/2 |
| 6,847,734 B1 * | 1/2005 | Hamamura | 382/229 |
| 2003/0065658 A1 * | 4/2003 | Matsubayashi et al. | 707/4 |
| 2005/0024679 A1 * | 2/2005 | Yoda et al. | 358/1.15 |

FOREIGN PATENT DOCUMENTS

| | | |
|---|---|---|
| JP | 04-158478 | 6/1992 |
| JP | 08-115330 | 5/1996 |
| JP | 2002-189747 | 7/2002 |
| JP | 2002312365 A * | 10/2002 |

OTHER PUBLICATIONS

Di Lecce, V. et al.; A new database of confusing characters for testing character recognition algorithms; Image Analysis and Processing, 1999. Proceedings. International Conference on; Sep. 27-29, 1999; pp. 939-944.*

* cited by examiner

*Primary Examiner*—R. Stephen Dildine
(74) *Attorney, Agent, or Firm*—Townsend and Townsend and Crew LLP

(57) ABSTRACT

Disclosed are a document retrieval method and system for separately performing a process for correcting erroneously recognized characters existing in characteristic character strings within a seed document or the documents to be registered and a process for tolerating erroneously recognized characters existing in the documents targeted for retrieval. The process for correcting erroneously recognized characters existing in characteristic character strings extracts characteristic character strings from a read document, replaces the extracted characteristic character strings containing erroneously recognized characters with character strings appropriate for document retrieval, and selects characteristic character strings for use in actual document retrieval.

21 Claims, 24 Drawing Sheets

FIG. 6

| CHARACTER | CANDIDATE CHARACTERS FOR RECOGNITION | | |
|---|---|---|---|
| | FIRST CANDIDATE | SECOND CANDIDATE | THIRD CANDIDATE |
| ⋮ | ⋮ | ⋮ | ⋮ |
| 一 | 一 | 一 | 一 |
| ⋮ | ⋮ | ⋮ | ⋮ |
| A | A | Δ | ∧ |
| ⋮ | ⋮ | ⋮ | ⋮ |
| z | Z | z | 2 |
| ⋮ | ⋮ | ⋮ | ⋮ |
| カ | カ | カ | ナ |
| ⋮ | ⋮ | ⋮ | ⋮ |
| サ | サ | ナ | 廿 |
| ⋮ | ⋮ | ⋮ | ⋮ |
| ツ | ツ | ツ | ソ |
| ⋮ | ⋮ | ⋮ | ⋮ |
| ナ | ナ | 十 | 十 |
| ⋮ | ⋮ | ⋮ | ⋮ |
| 日 | 日 | 目 | 白 |
| ⋮ | ⋮ | ⋮ | ⋮ |
| 本 | 本 | 木 | 不 |
| ⋮ | ⋮ | ⋮ | ⋮ |

SIMILAR-CHARACTERS TABLE 255

| CHARACTER | CANDIDATE CHARACTER (WEIGHT VALUE ENCLOSED BY PARENTHESES) |
|---|---|
| A | A(0.8), ヘ(0.2), ^(0.1), |
| B | B(0.75), R(0.2), P(0.05), |
| C | C(0.5), c(0.3), 0(0.1), o(0.1), |
| ⋮ | ⋮ |
| あ | あ(0.5), ぁ(0.3), を(0.1), な(0.1), |
| い | い(0.6), ぃ(0.6), "(0.1), ハ(0.1), |
| ⋮ | ⋮ |
| 日 | 日(0.4), 曰(0.3), 白(0.2), 月(0.1), |
| ⋮ | ⋮ |
| 本 | 本(0.6), 丕(0.2), 区(0.1), 未(0.1), |
| ⋮ | ⋮ |

1500 DEGREE-OF-CHARACTER-ASSURANCE INFORMATION CREATION PROGRAM

DEGREE-OF-CHARACTER-ASSURANCE INFORMATION 1600

| CHARACTER STRING C | DEGREE OF CHARACTER ASSURANCE S |
|---|---|
| A | 0.95 |
| B | 0.88 |
| C | 0.75 |
| ⋮ | ⋮ |
| あ | 0.67 |
| い | 0.81 |
| ⋮ | ⋮ |
| 日 | 0.49 |
| ⋮ | ⋮ |
| 本 | 0.65 |
| ⋮ | ⋮ |

(The Japan social coach is satisfied with doing his best in the game faced #######)

2002年 ####ワールドカップ

(World Cap Soccer 2002, Korea/Japan)

DISPLAY FOR CORRECTING THE CHARACTER RECOGNITION RESULTS

THE CONTENTS OF DOCUMENT TO BE REGISTERED - THE CHATRACTER RECOGNITION RESULTS

イタリア戦の大善戦に満足する監督
(The Japan social coach is satisfied with doing his best in the game faced Azzurri)
Nov. 08, 2001

2002年 ナッカーワールドカップ
(World Cap Soccer 2002, Korea/Japan)
優勝候補の一角である
「Azzurri(サッカーイタリア代表の愛称)」相手に、
サッカー日本代表が歴史的な大善戦を演じた。

[AUTOMATIC CORRECTION] [BATCH CORRECTION OF SELECTED CHARACTER STRING] [NO CORRECTION]

| ☑ | サッカー ▶ | [CORRECTION] | ☐ | イタリア ▶ | [CORRECTION] | ☐ | Azzurvi ▶ | [CORRECTION] |
| ☐ | ナッカー ▶ | [CORRECTION] | ☐ | 仁 ▶ | [CORRECTION] | ☐ | 代表 ▶ | [CORRECTION] |
| ☐ | サッカー... | [CORRECTION] | | | | | | |

DOCUMENT RETRIEVAL METHOD AND DOCUMENT RETRIEVAL SYSTEM

BACKGROUND OF THE INVENTION

1. Field of the Invention

The present invention relates to a computer-based document retrieval system and document management system, and more particularly to a document registration method, retrieval method, document registration/retrieval equipment, and storage media storing a document registration/retrieval program, which are used to search a set of image documents, electronic versions of paper documents, for the purpose of retrieving a document whose contents are similar to those of a user-specified document with high accuracy.

2. Description of Related Art

Large quantities of documents exist in an office. In recent years, it is important for work efficiency enhancement that documents be shared within an office and managed so as to offer user-specified documents promptly and accurately. As a document sharing method for electronic data that is created by word-processing software or the like, a document management system has already been commercialized to offer a high-speed, efficient scheme for retrieving specified documents. As a paper document sharing system, an image document management system is available for reading paper documents with a scanner or like device and managing them as image data.

It is demanded that the image document management system offer means for registering image data with ease and recalling stored image data for reuse. For the reuse of stored image data, it is essential that the image document management system provide means for retrieving image data and other electronic data containing user-specified information at high speed and with high efficiency.

As a method for retrieving electronic data containing user-specified information at high speed and with high efficiency, a similar-documents retrieval technology has been commercialized. It exemplifies a document (hereinafter referred to as a seed document) that contains user-specified contents, and retrieves a document similar to the seed document.

A typical similar-documents retrieval method capable of handling image data is disclosed by JP-A No. 115330/1996 (hereinafter referred to as Prior Art 1). In a document registration process, Prior Art 1 reads a paper document as image data, converts the image data to text data by exercising a character recognition function to extract character information from the image data, and registers the text data together with the image data. To perform a document retrieval process, this technology reads a paper document as image data, converts the image data to text data by exercising a character recognition function to extract character information from the image data, and automatically searches the text data to extract a character string that characterizes the paper document (hereinafter referred to as a characteristic character string).

It is known that a character recognition error can occur when the character recognition technology is exercised to extract character information. However, Prior Art 1 presumes that the same scanner and OCR (Optical Character Recognition) device are used for the document registration process and document retrieval process. Based on such a presumption, Prior Art 1 can assure consistent character recognition accuracy for generated text data. More specifically, the text data entered as retrieval condition data and text data targeted for retrieval have the same tendencies in terms of erroneously recognized characters; therefore, Prior Art 1 cannot possibly incur a mismatch of characteristic character strings.

However, the above presumption makes it necessary to use exactly the same machine for registration and retrieval. It means the lack of convenience because a person who intends to retrieval a document must take the trouble to move to a registration machine. Even if the use of the same scanner and OCR device is adhered to, these character recognition devices do not always generate the same results when they encounter the same characters. The character recognition results may vary with the inclination of the read paper document and the size, vividness, inclination, font, and other factors of characters existing in the read document. Therefore, any characters can be correctly recognized in a certain situation and erroneously recognized in another situation.

When, for example, the character "E" exists within image data, the character recognition result normally produced by an OCR device is the character "E". However, if the character is inclined, blurred, or otherwise degraded in quality due, for instance, to paper document contamination, it may be often erroneously recognized as the character "F", "B", "Σ", "L", or "Γ" even during the use of the same OCR device. Therefore, if a certain character is erroneously recognized in either one of a seed document and document targeted for retrieval and correctly recognized in the other, the characteristic character strings may fail to match, causing inadequate retrieval.

Further, the presumption made by Prior Art 1 does not hold true when the user makes a seed document entry by keying in natural text, if the scanner used for seed document setup differs from the scanner used for documents targeted for retrieval or if the OCR device used for seed document setup differs from the OCR device used for documents targeted for retrieval. As a result, inadequate retrieval may occur because the characteristic character strings existing in a seed document conflict with the characteristic character strings in documents targeted for retrieval.

Suppose that an existing paper document containing the characterstring"サッカー日本代表ブラジルと対戦(Japanese soccer representatives compete with Brazil)" is character-recognized as "ナッカー日本代表ブラジル仁対戦" by an OCR device. Also, suppose that characteristic character strings such as "ナッカー", "日本", "代表", "ブラジル", and "仁" are extracted from the above character recognition result. In this situation, documents targeted for retrieval in which "サッカー(soccer)" is erroneously recognized as "ナッカー" can be retrieved, wherein "ナッカー" is produced because of the first character "サ" erroneously recognized as "ナ"; however, documents in which "サッカー" is correctly recognized as "サッカー" or erroneously recognized as "サソカー" will not be retrieved so that inadequate retrieval results.

In the case of "サッカー", the character "サ" is recognized as "ナ" when the OCR device failed to recognize the shorter vertical line of "サ". In addition, "サンカー" is produced instead of "サッカー" because of the second character "ツ" erroneously recognized as "ソ". In this case, the character "ツ" was regarded as "ソ" because both have a curved line on the right side and one or two short bars on the left side although they are different in character size.

Further, since the character "と" is erroneously recognized as "仁", for a reason that both characters have two horizontal lines and a vertical line laid on the upper horizontal line, the document retrieval result includes a document that contains the character string "日本を代表する古墳の仁徳天皇陵 (Nintoku Emperor's tomb, a representative Japanese burial mound)" and is unnecessary for a document-retrieving user. If the user enters the character string "サッカー日本代表、ブラジルと対戦" to specify the seed document for retrieval, documents in which "サッカー" is erroneously recognized as "ナッカー" will not be retrieved.

Concisely, there is a character-recognition-induced gap, in reality, between characteristic character strings specified as retrieval conditions or extracted from a seed document and characteristic character strings existing in documents targeted for retrieval. Since Prior Art 1 does not perform a process for making up the gap, it incurs a mismatch of characteristic character strings, thereby reducing the retrieval accuracy.

A typical retrieval method for bridging a character-recognition-induced gap between characteristic character strings specified as retrieval conditions and characteristic character strings existing in documents targeted for retrieval is disclosed by JP-A No. 158478/1992 (hereinafter referred to as Prior Art 2). This technology learns about the tendency in the occurrence of a recognition error in advance and uses the result of such learning for retrieval to tolerate erroneously recognized characters in the documents targeted for retrieval, thereby conducting a full-text search with high accuracy and without requiring human proofreading. The term "full-text search" refers to a technology for retrieving documents that contain user-entered character strings for retrieval.

In prior art 2, the text data produced by OCR device is registered as a document without correcting it. That is to say, prior art 2 avoids inadequate retrieval due to erroneously recognized characters contained in the retrieval target by improving retrieval processing, without requiring human correction operations before the document registration.

For certain characters, Prior Art 2 causes a similar-characters table to store recognition candidate characters that are likely to be used as a result of erroneous character recognition. In a retrieval process, this technology divides a character string for retrieval into individual characters while referencing the similar-characters table, checks the resulting individual characters with reference to the similar-characters table, and develops a plurality of character strings (hereinafter referred to as developed words) by combining the recognition candidate characters for all the referenced characters. To retrieve documents containing one or more of the developed words, this technology conducts a full-text search for a set of logical adds (ORs) (hereinafter referred to as an extended characteristic character string), thereby tolerating erroneously recognized characters in the documents targeted for retrieval.

When the full-text search method provided by Prior Art 2 above is applied to the retrieval of similar documents, retrieval can be achieved while tolerating erroneously recognized characters existing in the documents targeted for retrieval. However, Prior Art 2 cannot solve problems that are caused by erroneously recognized characters existing in a seed document. For example, if the above-mentioned character string "サッカー(soccer)" is erroneously recognized as "ナッカー" or "サソカー" in a document targeted for retrieval, retrieval can be accomplished by the use of Prior Art 2.

SUMMARY OF THE INVENTION

However, if the character string "サッカー" is erroneously recognized as "ナッカー" within a seed document, the character "ナ" may be found to be similar in shape to the character "十" (Japanese "ten"), "+", or "t" since a horizontal line and a vertical line are crossing at the vicinity of the center in all these characters, but may not be found to be similar in shape to the character "サ", while "十", "+", or "t" is rarely taken as the character "サ" because "サ" has two vertical lines one of which curves in a direction of left unlike these other characters. The reason is that while the character "サ" can be erroneously recognized as the character "ナ", the character "ナ" is rarely taken as the character "サ". In this case, the character "ナッカー" cannot be developed into the character "サッカー" even when a similar technology is applied to a seed document. That is why the characteristic character string "サッカー" may be excluded. Further, if the character "と" is erroneously recognized as the character "仁" an unnecessary document containing the character string "日本を代表する古墳の仁徳天皇陵(Nintoku Emperor's tomb, a representative Japanese burial mound)" will be retrieved. This type of problem cannot be solved even when Prior Art 2 is applied to similar-documents retrieval.

As stated above, the use of the same OCR device for document registration and document retrieval not only incurs the lack of convenience but also reduces the retrieval accuracy due to character-recognition-induced gaps between characteristic character strings in a seed document and characteristic character strings existing in documents targeted for retrieval.

Under these circumstances, the present invention provides an image data based, high-precision document information retrieval method and information storage device by bridging the characteristic character string gaps that exist between a seed document and documents targeted for retrieval due to the existence of erroneously recognized characters.

To provide the above device, the present invention performs process (A), which corrects erroneously recognized characters existing in a seed document or the document to be registered, and process (B), which tolerates erroneously recognized characters existing in documents targeted for retrieval, before proceeding to perform a document information registration process or retrieval process.

More specifically, process (A), which is provided by the present invention to correct erroneously recognized characters existing in a seed document or the document to be registered, comprises (1) a document read step for reading a document, (2) a characteristic character string extraction step for extracting characteristic character strings from a document read in the above document read step, (3) a characteristic character string correction step for generating weight values to correct all the characteristic character strings that are obtained in the above characteristic character string extraction step and contain erroneously recognized characters, and (4) a characteristic character string selection step for selecting characteristic character strings for use in a retrieval process in accordance with the characteristic character strings corrected in the above characteristic character string correction step.

On the other hand, process (B), which is provided by the present invention to tolerate erroneously recognized characters existing in documents targeted for retrieval, comprises (1) a characteristic character string development step for checking all the characteristic character strings selected in the above characteristic character string selection step in advance to enumerate candidate characters that may be erroneously recognized by an OCR device, referencing the similar-characters table stored in a storage area, and combining the referenced candidate characters to develop and extend the characteristic character strings, and (2) a retrieval expression generation step for generating a document retrieval command in accordance with the characteristic character strings developed in the above characteristic character string development step.

As stated above, erroneously recognized characters in a seed document and erroneously recognized characters in documents targeted for retrieval are independently processed so as not to adversely affect a retrieval process. Thanks to this processing scheme, high-precision similar-documents retrieval can be accomplished without requiring human proofreading for the correction of characters erroneously recognized by an OCR device no matter whether different scanners are used for imaging a seed document and imaging documents targeted for retrieval, different OCR devices are used for extracting character information from a seed document and from documents targeted for retrieval, erroneously recognized characters are contained in either a seed document or documents targeted for retrieval, and erroneously recognized characters are contained in both a seed document and documents targeted for retrieval.

BRIEF DESCRIPTION OF THE DRAWINGS

FIG. 6 shows an exemplified similar-characters table;

FIG. 17 is a second schematic diagram that illustrates how to prepare degree-of-character-assurance information;

FIG. 22 shows an exemplified result that is obtained when a seed document is masked according to the third preferred embodiment;

FIG. 24 shows an exemplified user interface that automatically corrects erroneously recognized characters in the document to be registered according to the third preferred embodiment.

DETAILED DESCRIPTION OF THE PREFERRED EMBODIMENTS

Preferred embodiments of the present invention will be described in detail with reference to the accompanying drawings. It must be recognized that the present invention is not intended to be limited only to the embodiments described below.

First of all, a first preferred embodiment will be described with reference to drawings.

Figure 1:
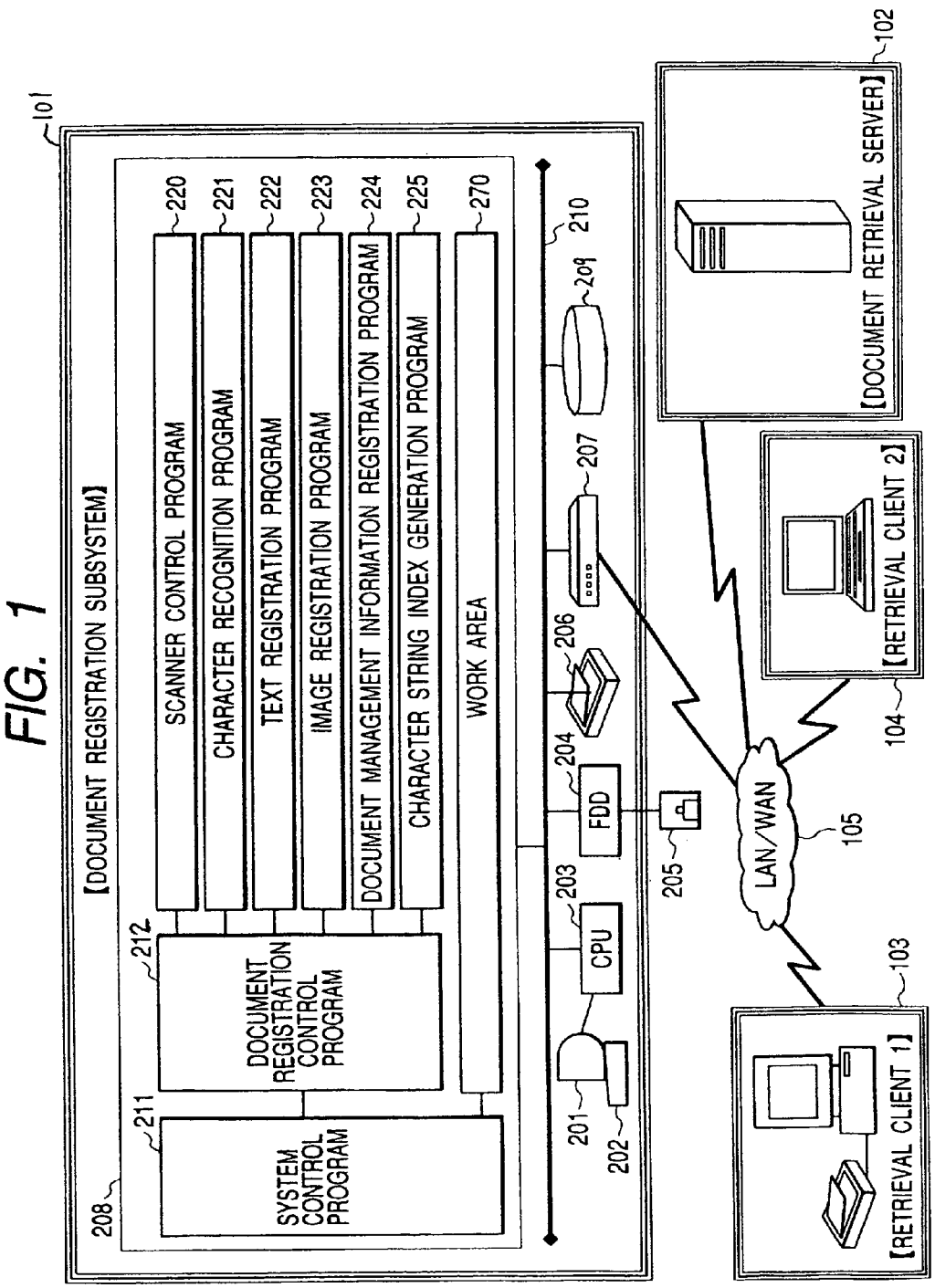
FIG. 1 shows the overall system configuration and document registration subsystem configuration of a document retrieval system according to a first preferred embodiment.

FIG. 1 shows the overall system configuration of the first preferred embodiment. As indicated in FIG. 1, the present embodiment comprises a document registration subsystem 101, a document retrieval server 102, retrieval clients 103, 104, and a network 105.

The document registration subsystem 101 receives each paper document that is entered as a retrieval target, converts it to image data with a scanner 206, extracts character information from the image data with an OCR device, and outputs it as text data. The output text data is then analyzed to create index data, which is necessary for document retrieval. The index data is transferred together with the generated image data, text data, and document management information to the document retrieval server 102 via the network 105, and used later in a retrieval process that is performed by the document retrieval server 102.

The document retrieval server 102 receives a retrieval command from retrieval client 103 or 104, uses the index data generated by the document registration subsystem 101 to search for the contents of documents that match the conditions specified by the retrieval command, and returns retrieval result data to the requesting retrieval client.

The retrieval clients 103, 104 open a screen on a display to let a user specify the retrieval conditions interactively, convert the user-specified displayed retrieval conditions into a retrieval command interpretable by the document retrieval server 102, and transmit the retrieval command to the document retrieval server 102 via the network 105.

When the document retrieval server 102 performs a process in accordance with the retrieval command and returns retrieval result data to a retrieval client as described earlier, the retrieval client displays the received retrieval result data on screen to present it to the user. The user may specify text data or image data as retrieval conditions.

For retrieval condition input purposes, the user may enter natural text from a keyboard, use data stored in the document registration subsystem 101 or document retrieval server 102, use image data obtained by scanning a paper document on hand, read image data or text data from floppy disks, optical disks, or other portable storage media, or enter image data or text data transferred from the network 105. Any of the above retrieval condition input forms may be used.

Although the configuration shown in FIG. 1 uses two computers 103, 104 as retrieval clients, an alternative configuration may be formed to use only one retrieval client or three or more retrieval clients.

The network 105 is a local area network and/or wide area network. The document registration subsystem 101, document retrieval server 102, and clients 103, 104 use this network to transmit/receive various data and commands.

In the configuration shown in FIG. 1, the network 105 is used when the document registration subsystem 101 transfers index data to the document retrieval server 102. However, an alternative configuration may be employed so as to use floppy disks, magneto-optical disks, write-once, read-many optical disks, or other portable storage media instead of the network 105. Another alternative configuration may also be employed so as to form a configuration in which the document registration subsystem 101 and document retrieval server 102 are implemented on a single computer to eliminate the need for data transfer. Although FIG. 1 depicts a configuration in which separate computers are furnished for use by retrieval clients 103 and 104 and document retrieval server 102, an alternative configuration may be employed so as to execute one or more retrieval clients on the same computer as for the document retrieval server.

The document registration subsystem 101 comprises a display 201, a keyboard 202, a central processing unit (CPU) 203, a floppy disk drive (FDD) 204, a floppy disk 205, a scanner 206, a communication controller 207, a main memory 208, a hard disk drive 209, and a system bus 210.

The display 201 is a device for displaying information about processes that are performed by the document registration subsystem. The keyboard 202 is used to enter a command for issuing instructions for document registration process execution and other operations. The central processing unit 203 is a processor for executing various programs that constitute the subsystem. The floppy disk drive 204 is used to read data from and write data onto a floppy disk 205.

The scanner 206 is used to read the paper document to be registered, generate image data as an electronic version of the paper document, and enter the image data into the subsystem. The communication controller 207 is used to communicate with the above-mentioned document retrieval server 102 via the network 105 and transmit/receive requests and data concerning document registration or document retrieval.

The main memory 208 is used to store various programs and temporary data for processes that are performed by the subsystem. The hard disk drive 209 is used to store registered image data, text data, index data created by the subsystem, document management information for defining the relationship between image data and text data, and all sorts of programs. The system bus 210 is used to interconnect various devices described above.

The main memory 208 stores a system control program 211, a document registration control program 212, a scanner control program 220, a character recognition program 221, a text registration program 222, an image registration program 223, a document management information registration program 224, and a character string index generation program 225, and contains an area that is allocated as a work area 270. The above programs are stored on a floppy disk 205, magneto-optical disk, or other portable storage media, and read from such media for installation on the hard disk drive 209. When the subsystem starts up, the system control program 211 starts running, reads the programs from the hard disk drive 209, and loads them into the main memory 208.

Within the hard disk drive 209, areas for a text file 250, an image file 251, an index file 252, a document management information 253, and all sorts of programs 254 are allocated.

The system control program 211 offers a function for performing data input/output operations in relation to peripheral devices and other basic functions for executing various programs that constitute the subsystem on a computer. The document registration control program 212 not only exercises startup/execution control over the scanner control program 220, character recognition program 221, text registration program 222, image registration program 223, document management information registration program 224, and character string index generation program 225, but also transfers text data, image data, index files, and document management information generated by the above programs to the above-mentioned document retrieval server 102 via the network 105. The work area 270 is used to store data that is temporarily required for program execution.

The scanner control program 220 starts the scanner 206 in which the paper document to be registered is set, and generates image data from the paper document. The character recognition program 221 enters the image data generated by the scanner control program and extracts character information to generate text data. The text registration program 222 registers the text data generated by the character recognition program in the area of text file 250 on the hard disk drive 209. The image registration program 223 registers the image data, which is output by the scanner control program, in the image file 251 on the hard disk drive 209. The document management information registration program defines the association between the identifiers for the image data generated by the scanner control program and the text data generated by the character recognition program, and registers the association definition in the area of the document management information 253. The character string index generation program 225 checks the text data generated by the character recognition program, generates data that represents the relationship between specific partial character strings and the character position information about such partial character strings, and registers the generated data with an index stored in the index file 252 to update the index.

Although the configuration formed by the present embodiment is such that the image data input from the scanner 206 is to be entered as the document to be registered, an alternative configuration may be employed so as to read image data from floppy disks, magneto-optical disks, write-once, read-may optical disks, or other portable storage media or enter image data transferred via the network 105. Another alternative configuration may be formed without a scanner or OCR device to read an electronic version of text data from portable storage media, manually enter data directly via the keyboard 202, or enter text data transferred via the network 105.

If text data is used as input data, the information about associated image data may consist of empty data to which a tentative document identifier is attached or information is attached to indicate that no image data exists. In the configuration formed by the present embodiment, generated text data, image data, index files, and document management information are transferred to the document retrieval server 102. However, an alternative configuration may be employed so as to transfer only the generated index files or the combination of the generated index files and one of the data to the document retrieval server 102, allowing the actual data to be stored in the associated document registration subsystem.

Figure 2:
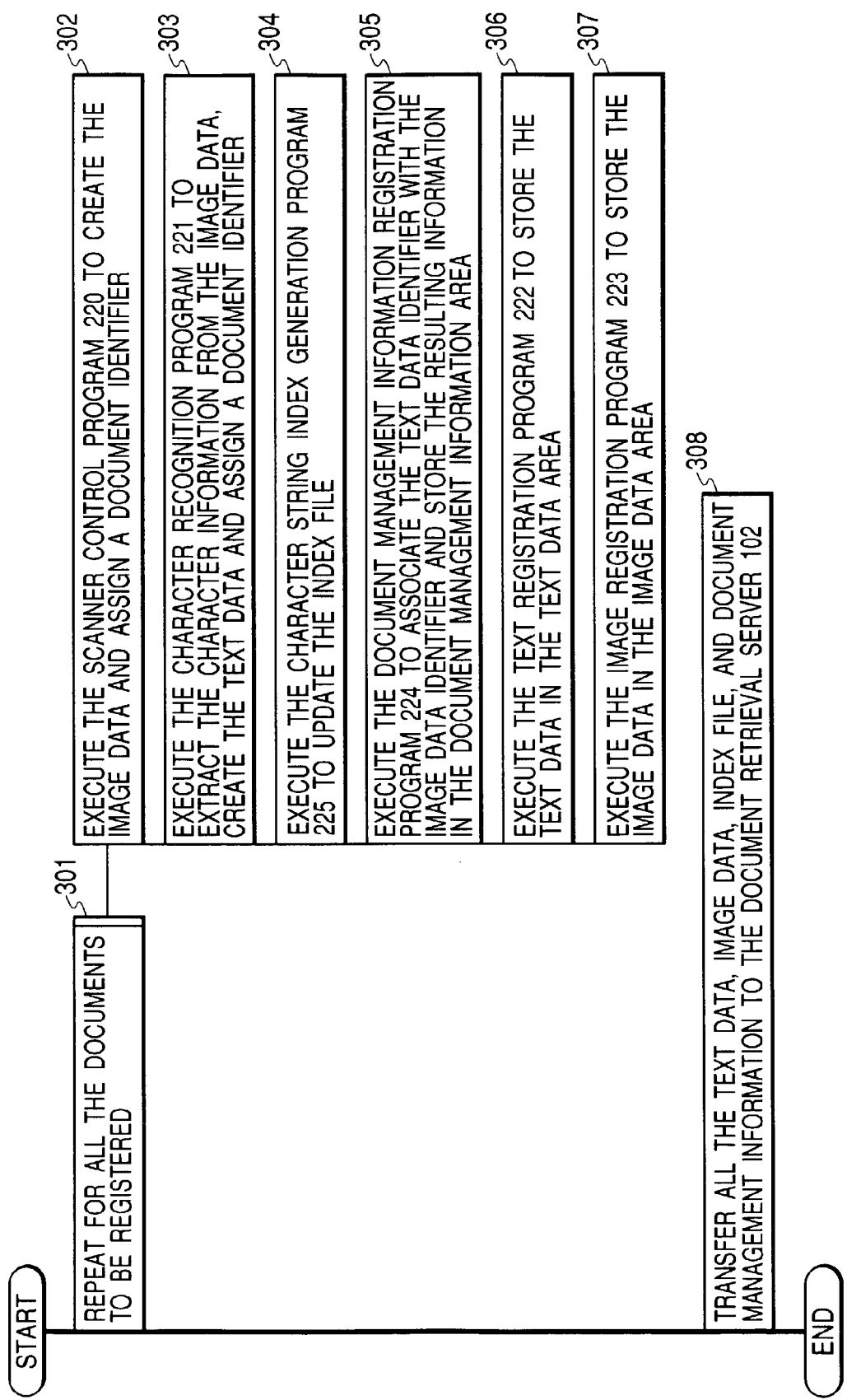
FIG. 2 is a PAD chart that outlines the steps to be performed by a document registration subsystem according to the first preferred embodiment.

The document registration, steps to be performed according to the present embodiment will now be described with reference to FIG. 2. When started by a registration instruction or like command from the keyboard 202, the document registration control program 212 first starts the scanner control program 220 to check whether a paper document is loaded in the scanner 206. This program repeats a series of processing steps indicated below (steps 302 to 307) for all the documents to be registered (step 301).

In step 302, the scanner control program 220 runs, causing the scanner 206 to read the paper document to be registered and convert it into image data. The paper document to be registered may contain charts and illustrations. Further, the image data derived from conversion is stored in the work area 270 with a document identifier assigned to it. The document identifier is a number that identifies a document within a document database.

In step 303, the character recognition program 221 based on a well-known character recognition technology is executed to achieve character recognition using the image data generated in step 302 as the input and extract character information existing in the image data. The extracted character information is stored in the work area 270 as text data with a document identifier assigned to it.

In step 304, the text data generated in step 303 is entered to execute the character string index generation program 225. The character string index generation program reads the current character string index from the index file 252, generates data that represents the relationship between specific partial character strings and the position information about such partial character strings, registers the generated data with an index file, and stores the updated index file in the area of the index file 252.

In step 305, the document management information registration program 224 is executed using the text data and image data stored in the work area as the input. The document identifiers for the text data and image data stored in the work area are associated with each other, and the information about the associated data is registered in the area of document management information 253. The information about the associated data can easily be realized when a relationship-indicating table is maintained.

In step 306, the text data stored in the work area is entered to execute the text registration program 222. The text registration program registers the entered text data and document identifier in the area of text file 250. In step 307, the image data stored in the work area is entered to execute the image registration program 223. The image registration program registers the entered image data and document identifier in the area of image file 251.

When the above series of processing steps (steps 302 to 307) is completed for all the documents to be registered, the document registration control program 212 performs step 308 and then comes to an end. In step 308, all text data stored in the text file 250, all image data stored in the image file 251, all index files stored in the index file 252, and all document management information stored in the document management information 253 are transferred to the document retrieval server 102 via the network 105.

Figure 3:
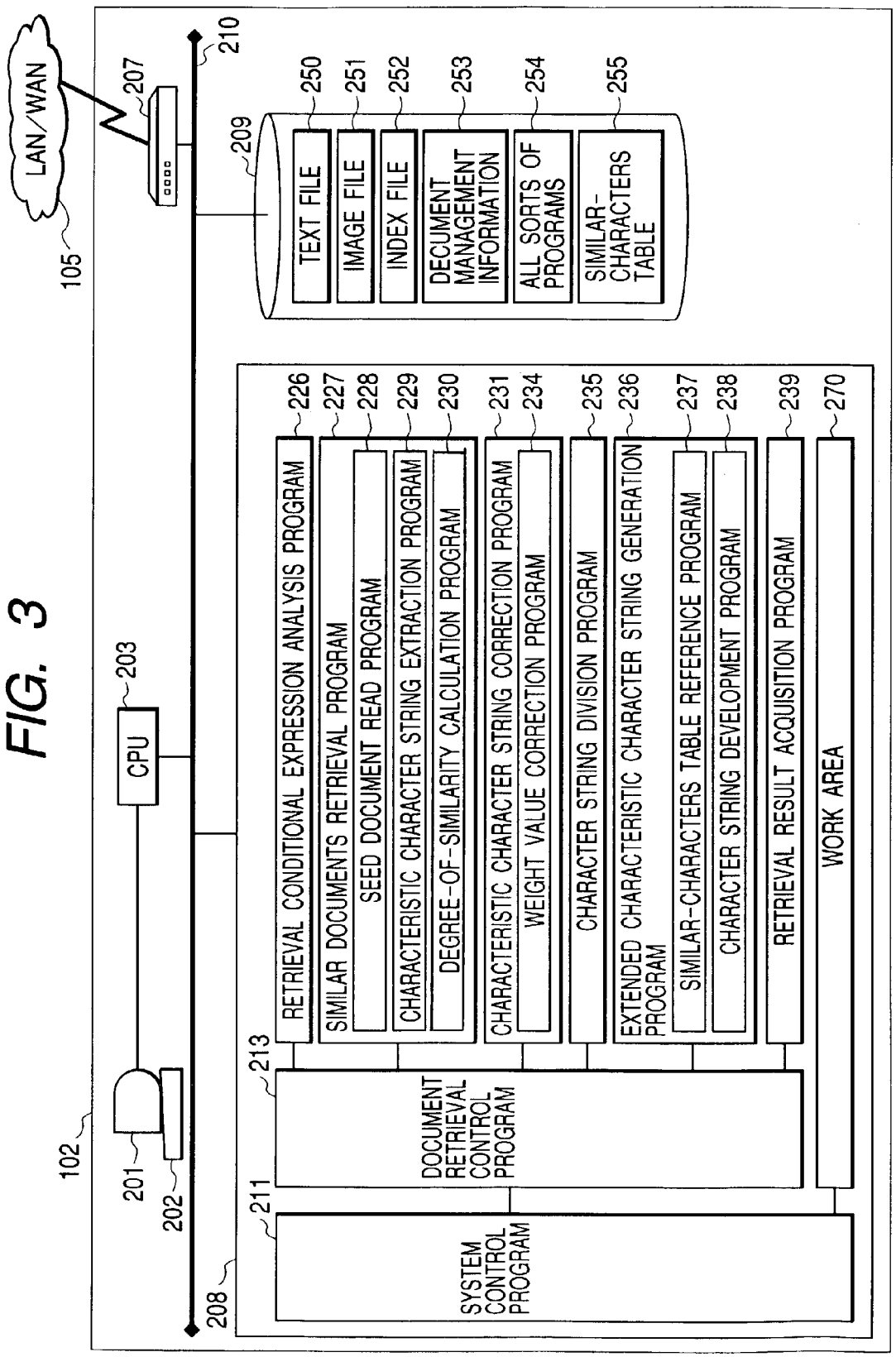
FIG. 3 shows the configuration of a document retrieval server of a document retrieval system according to the first preferred embodiment.

The document retrieval server 102 has the same system configuration as the document registration subsystem 101 except that the former does not incorporate the scanner 206 as a system component. The document retrieval server also differs from the document registration subsystem in the programs and data stored on the main memory 208 and the hard disk drive 209. FIG. 3 shows the configuration of the document retrieval server 102 according to the present embodiment.

The main memory 208 stores a system control program 211, a document retrieval control program 213, a retrieval conditional expression analysis program 226, a similar-documents retrieval program 227, a characteristic character string correction program 231, a character string division program 235, an extended characteristic character string generation program 236, and a retrieval result acquisition program 239, and contains an area that is allocated as a work area 270.

Within the hard disk drive 209, areas of a text file 250, an image file 251, an index file 252, a document management information 253, all sorts of programs 254, and a similar-characters table 255 are allocated.

The document retrieval control program 213 exercises startup/execution control over the retrieval conditional expression analysis program 226, similar-documents retrieval program 227, characteristic character string correction program 231, character string division program 235, extended characteristic character string generation program 236, and retrieval result acquisition program 239, and exchanges a document registration or document retrieval request and data between the document registration subsystem 101 and retrieval clients (103 and 104) via the network 105.

The retrieval conditional expression analysis program 226 analyzes the retrieval conditional expression within retrieval requests received from a retrieval client 103, 104, and translates them into specified conditions that can be directly used for retrieval by the similar-documents retrieval program 227.

In accordance with the specified conditions translated by the retrieval conditional expression analysis program 226, the similar-documents retrieval program 227 searches for an index stored in the index file 252 and stores the obtained retrieval result data in the work area 270. The similar-documents retrieval program 227 comprises a seed document read program 228, a characteristic character string extraction program 229, and a degree-of-similarity calculation program 230, and is configured to call the characteristic character string correction program 231 as described later.

The characteristic character string correction program 231 comprises a weight value correction program 234. It performs a process to correct extracted characteristic character strings and their weight values, and is configured to call the extended characteristic character string generation program 236.

The extended characteristic character string generation program 236 comprises a similar-characters table reference program 237 and a character string development program 238, and is configured to call the character string division program 235.

The retrieval result acquisition program 239 sorts the retrieval result data, which is acquired by the similar-documents retrieval program 227, in descending order of similarity, and transfers the resulting information to a requesting retrieval client.

Figure 4:
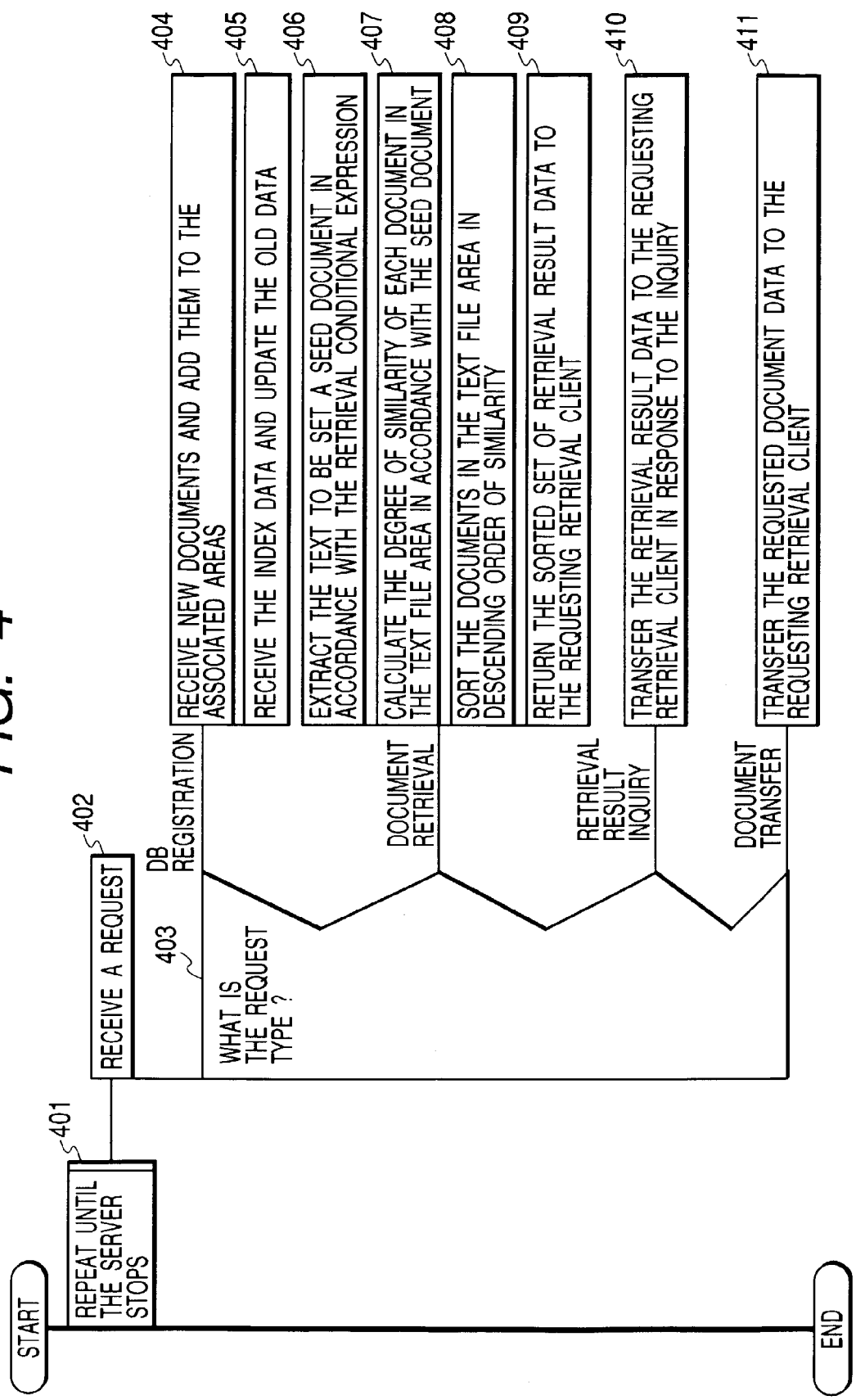
FIG. 4 is a PAD chart that outlines the steps to be performed by a document retrieval server according to the first preferred embodiment.

The document retrieval process steps to be performed according to the present embodiment will now be described with reference to FIG. 4. When started by a server startup or like command from the keyboard 202, the document retrieval control program 213 acts as a server to receive a request from the document registration subsystem 101 or retrieval client (103 or 104) and then enters a loop for processing the request (step 401). This loop continues until a server stop command is entered via the keyboard 202.

The loop in step 401 repeats the process for receiving a document registration or document retrieval request from the document registration subsystem 101 or retrieval client (103 or 104) (step 402) and the process for determining the type of the received request and branching to a process appropriate for the received request type (step 403).

In step 403, the received request type is determined. If the received request is a database update request that is transmitted from the document registration subsystem 101, the program branches to a process that consists of steps 404 and 405. If the received request is a document retrieval request (for requesting the retrieval of documents satisfying specific retrieval conditions) that is transmitted from a retrieval client (103 or 104), the program branches to a process that consists of steps 406, 407, 408, and 409. If the received request is a retrieval result inquiry request (for inquiring about the result of a specific retrieval process) that is transmitted from a retrieval client (103 or 104), the program branches to a process indicated in step 410. If the received request is a document transfer request (for requesting the transfer of a specific document) that is transmitted from a retrieval client (103 or 104), the program branches to a process indicated in step 411. Upon completion of a process at the branch destination, the program returns to step 402 and continues with the loop.

Step 404 is performed to receive the document data (text data and image data) about newly registered documents from the document registration subsystem 101 and add the text data within the received document data to the text file 250 and the image data to the image file 251.

Next, step 405 is performed to receive index data corresponding to the contents of above-mentioned newly registered documents from the document registration subsystem 101 and update the index data in the index file 252 to reflect the received index data.

In step 406, the retrieval conditional expression analysis program 226 is executed to analyze the retrieval conditions specified by a document retrieval request and convert them into specified conditions that can be directly processed by the similar-documents retrieval program 227. In addition, the text to be set as a seed document is extracted from a retrieval conditional expression and set as a seed document.

Next, step 407 is performed to enter the seed document, which has been generated in step 406, and specified conditions to execute the similar-documents retrieval program 227 for the purpose of retrieving the documents matching the seed document and specified conditions and calculating the degree of similarity of each retrieved document. The operations performed by the similar-documents retrieval program 227 in this step will be detailed later.

Next, step 408 is performed to start the retrieval result acquisition program 239, sort the documents in descending order of similarity calculated by the similar-documents retrieval program, and store the retrieval result data, which is obtained by compiling the information about the documents and their degrees of similarity, in the work area 270.

Next, step 409 is performed to return a set of the above retrieval result data or the retrieval result identifiers for the set of the retrieval result data to a requesting retrieval client.

In step 410, the retrieval result data, which has been obtained earlier (in step 408) in accordance with an inquiry, is extracted partly or wholly from the work area 270, and transferred to a requesting retrieval client.

In step 411, the document data about the document specified by a document transfer request (or all the specified documents if a plurality of documents are specified) is extracted from the text file 250 or image file 251 and transferred to a requesting retrieval client.

The document retrieval process of the present embodiment has been outlined above. The details of step 407 and the related programs will now be described with reference to the drawings.

Figure 5:
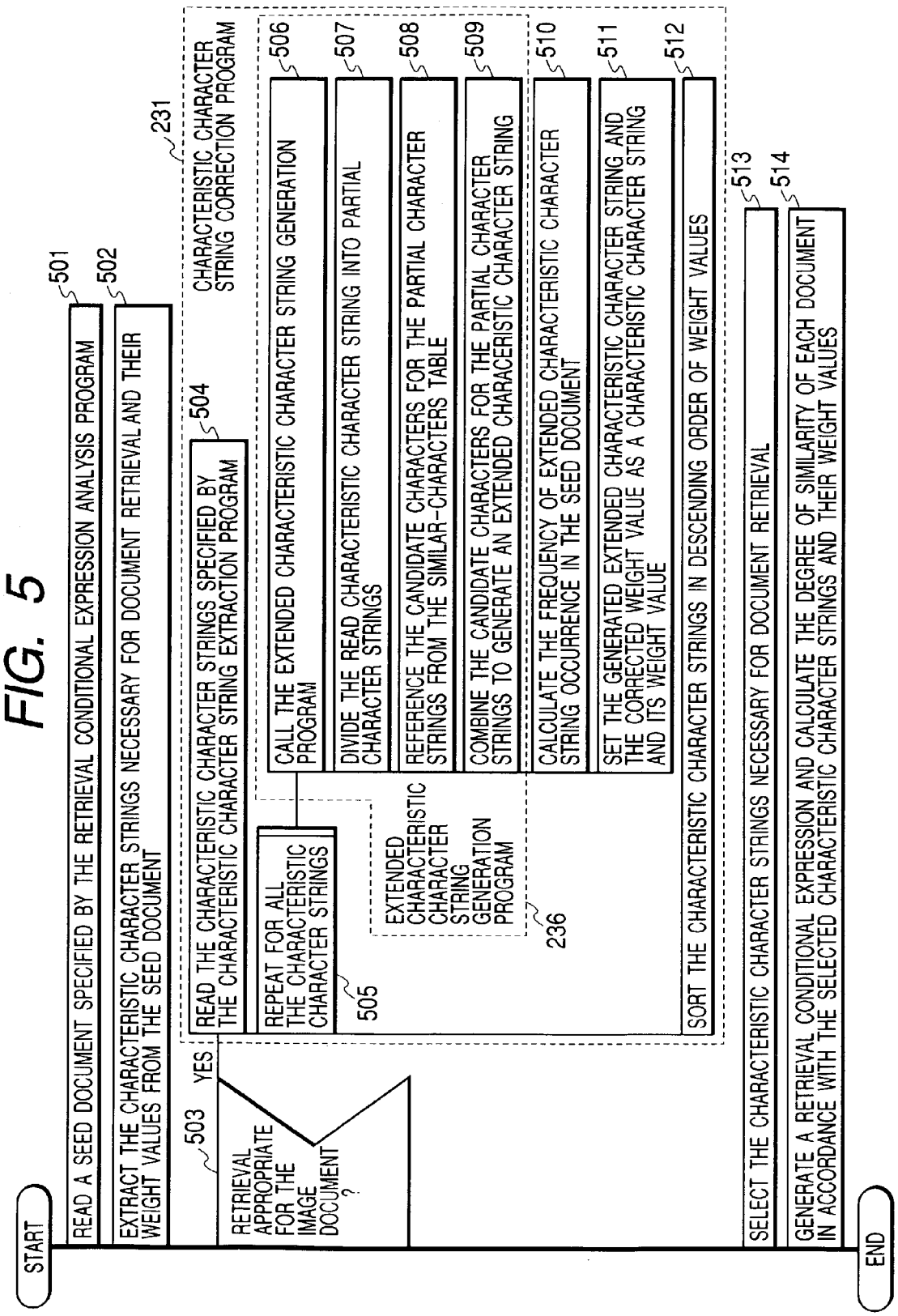
FIG. 5 is a PAD chart that outlines the steps to be performed by a similar-documents retrieval program according to the first preferred embodiment.

FIG. 5 is a PAD chart that describes the details of step 407, that is, the processing steps to be performed by the similar-documents retrieval program 227 of the present embodiment.

When started with a seed document and specified conditions existing in a document retrieval request entered, the similar-documents retrieval program 227 first stores the entered seed document in the work area 270 in step 501.

Next, step 502 is performed to start the characteristic character string extraction program 229 for the purpose of extracting characteristic character strings necessary for retrieval from the seed document read in step 501 and assigning a weight value for use in retrieval to each characteristic character string.

Next, step 503 is performed to check whether a retrieval operation is requested in accordance with the image data. Steps 504 to 512 are performed only when the retrieval request corresponds to the image data. If the retrieval request does not correspond to the image data, the program proceeds to step 513. The data used for the check in step 503 is to be set by a user or the system when retrieval condition setup is performed at a retrieval client 103.

Processing in steps 504 to 511 is performed by the characteristic character string correction program 231 of the present embodiment.

When the characteristic character string correction program 231 is called, it first stores the characteristic character strings specified by the characteristic character string extraction program 229 in the work area 270 (step 504).

Upon completion of step 504, the characteristic character string correction program reads the characteristic character strings, one by one, to enter a loop for processing them (step 505). When this loop processing operation is performed, the program can correct the characteristic character strings extracted from the seed document and tolerate erroneously recognized characters existing in the documents targeted for retrieval. The loop in step 505 is repeated until all the characteristic character strings are read. This loop repeats the process for generating extended characteristic character strings from characteristic character strings (steps 506 to 509), the weight value correction process for setting weight values for the generated extended characteristic character strings (step 510), and the process for setting the extended characteristic character strings and their weight values as characteristic character strings (step 511). Processing in steps 506 to 509 is performed by the extended characteristic character string generation program 236 of the present embodiment.

The extended characteristic character string generation program 236 reads the characteristic character string specified in step 505 (step 506).

Next, the read characteristic character string is entered to call the character string division program 235 for the purpose of dividing the characteristic character string into partial character strings in units of one character (step 507).

Further, the similar-characters table reference program 237 is started to reference the candidate characters for recognition, which are stored in the similar-characters table area 255, in relation to all the divided partial character strings, and set the candidate characters for recognition in units of one character for all the partial character strings (step 508).

Finally, the character string development program 238 is started to generate developed words by combining the candidate characters for recognition in units of one character for all the partial character strings, generate extended characteristic character strings by ORing the generated words, and output the extended characteristic character string (step 509).

Although the extended characteristic character string generation program 236 of the present embodiment has been described on the basis of the method provided by Prior Art 2, the program may alternatively perform processing in units of n characters (n>1) instead of one character. Further, each developed word generated in step 509 may alternatively be weighted to generate a weighted extended characteristic character string for each developed word. As regards the method for similar-characters table creation, the method provided by Prior Art 2 may be alternatively used. Further, a similar-characters table may be created in units of n characters. The methods related to the extended characteristic character string generation program 236 and the method for similar-characters table creation are established by Prior Art 2.

FIG. 6 shows an exemplified similar-characters table, which is used in step 509. The first column 2551 in FIG. 6 shows the characters to be recognized. The second column 2552 in FIG. 6 shows the first candidate character, which is most likely to be output as a result of character recognition. The third column 2553 in FIG. 6 shows another candidate character, which is likely to be output as the second candidate character as a result of character recognition. The fourth column 2554 shows another candidate character, which is likely to output as the third candidate character as a result of character recognition. Although FIG. 6 indicates that one character is stored in each cell in the first column 2551, a string of two or more characters such as "z,900 " and "Cup" may be stored instead. In this case, the second to fourth columns 2552, 2553, 2554 store strings of candidate characters for recognition, respectively.

In step 510, the weight value correction program 234 is executed for the extended characteristic character string generated in step 508 to set the weight value for use in retrieval. The weight value correction program 234 comprises the following two steps ((a) and (b)):

Step (a): Reads the extended characteristic character string generated by the extended characteristic character string generation program 236 and calculates the frequency with which the stored extended characteristic character string appears within the seed document. The extended characteristic character string is obtained by ORing the developed words. Therefore, when any developed word appears in the seed document, it can be counted as the frequency-of-occurrence information. Thanks to the process in step (a), erroneously recognized characters existing in the seed document can be tolerated to correct one of the parameters related to characteristic character string weight value setup.

Step (b): Uses a well-known calculation method to calculate the characteristic character string weight value in accordance with the calculated parameters, and outputs the calculated weight value.

In step 511, the extended characteristic character string generated earlier in step 509 and the weight value generated earlier in step 510 are set respectively as the characteristic character string and its weight value and stored in the work area 270.

After completion of steps 506 to 511, the program returns to step 505 and continues with the loop. When the loop in step 505 comes to an end, the program proceeds to perform a process for sorting the generated characteristic character strings (step 512). Step 512 is performed to sort the characteristic character strings in descending order of weight values and store the sorted characteristic character strings in the work area 270. Upon completion of step 512, the characteristic character string correction program 231 ends and the program flow proceeds to step 513.

In step 513, the characteristic character strings for use in retrieval are selected from the sorted characteristic character strings in accordance with selection criteria such as the weight values.

In step 514, the degree-of-similarity calculation program 230 based on a well-known technology is started. Using the selected characteristic character strings and their weight values as the input, the program calculates the degree of similarity of the documents existing in the text file 250.

The process performed by the similar-documents retrieval program 227, that is, step 407 of the aforementioned document retrieval process has been detailed above.

Figure 7:
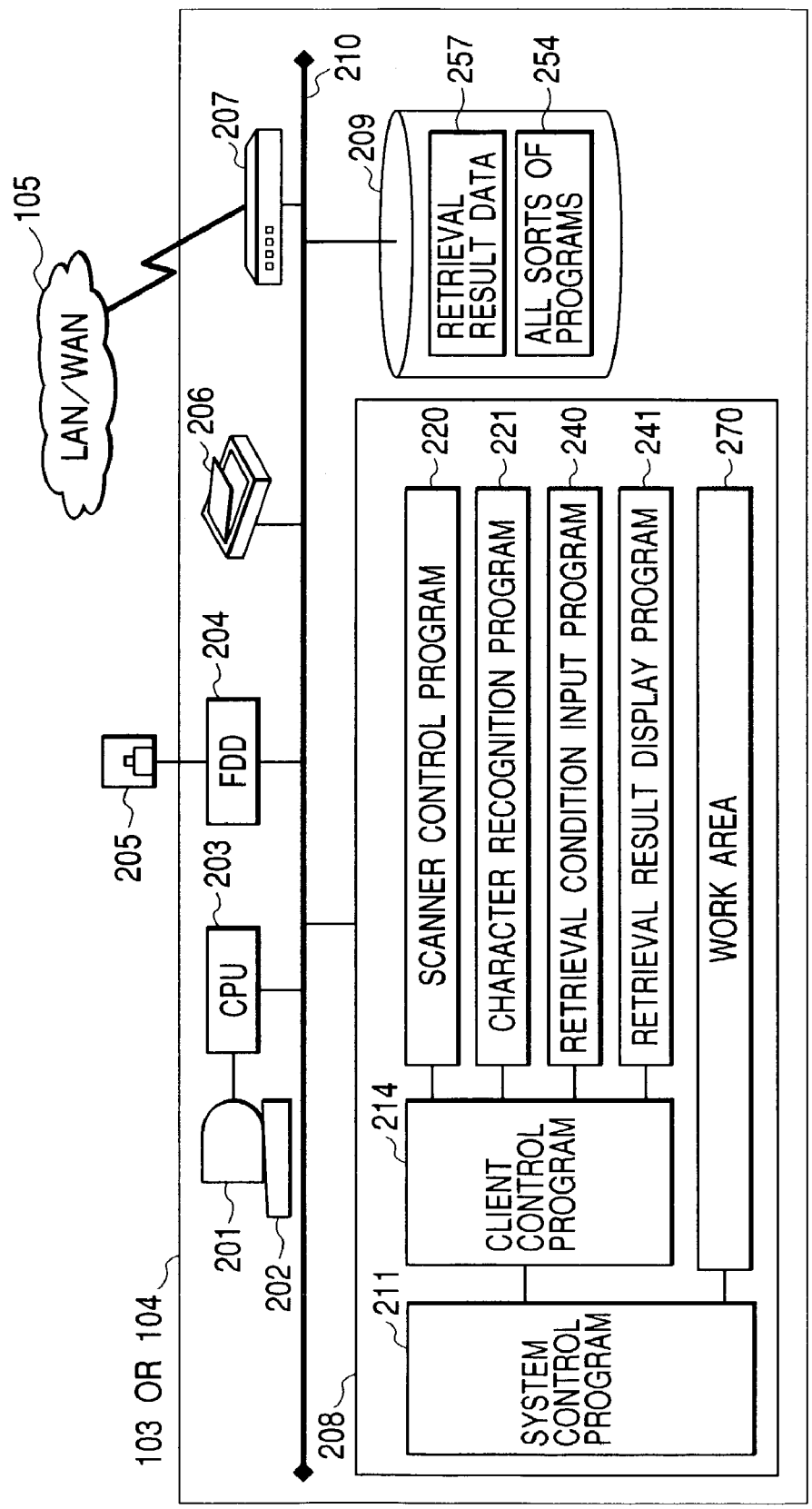
FIG. 7 shows the system configuration of retrieval client 103 or 104 according to the first preferred embodiment.

The retrieval client 103 or 104 has the same system configuration as the document registration subsystem 101. However, the retrieval clients differ from the document registration subsystem in the programs and data stored on the main memory 208 and the hard disk 209. FIG. 7 shows the system configuration of retrieval client 103 or 104.

The main memory 208 stores a system control program 211, a client control program 214, a scanner control program 220, a character recognition program 221, a retrieval condition input program 240, and a retrieval result display program 241, and contains an area that is allocated as a work area 270.

Within the hard disk drive 209, the areas of a retrieval result data 257 and all sorts of programs 254 are allocated.

The client control program 214 exercises startup/execution control over the scanner control program 220, character recognition program 221, retrieval condition input program 240, and retrieval result display program 241, and exchanges a document retrieval request and data with the document retrieval server 102 via the network 105.

The retrieval condition input program 240 enters and interprets retrieval conditions while interactively communicating with a user. The retrieval result display program 241 receives a retrieval result from the document retrieval server 102 and displays it.

Although the configuration formed by the present embodiment is such that the image data input from the scanner 206 is to be entered as a seed document for use in retrieval, an alternative configuration may be employed so as to read image data from the hard disk drive 209 or from floppy disks, magneto-optical disks, write-once, read-many optical disks, and other portable storage media. It is also possible to enter image data that is transferred via the network 105. When these configurations are employed, the scanner 206 is not required. Another alternative configuration may be employed to read an electronic version of text data from a hard disk or portable storage media without using a scanner or OCR device, enter data directly from the keyboard 202, or enter text data that is transferred via the network 105. In still another alternative configuration, a printer may be connected to the client (103 or 104) so as to print out retrieval results.

Figure 8:
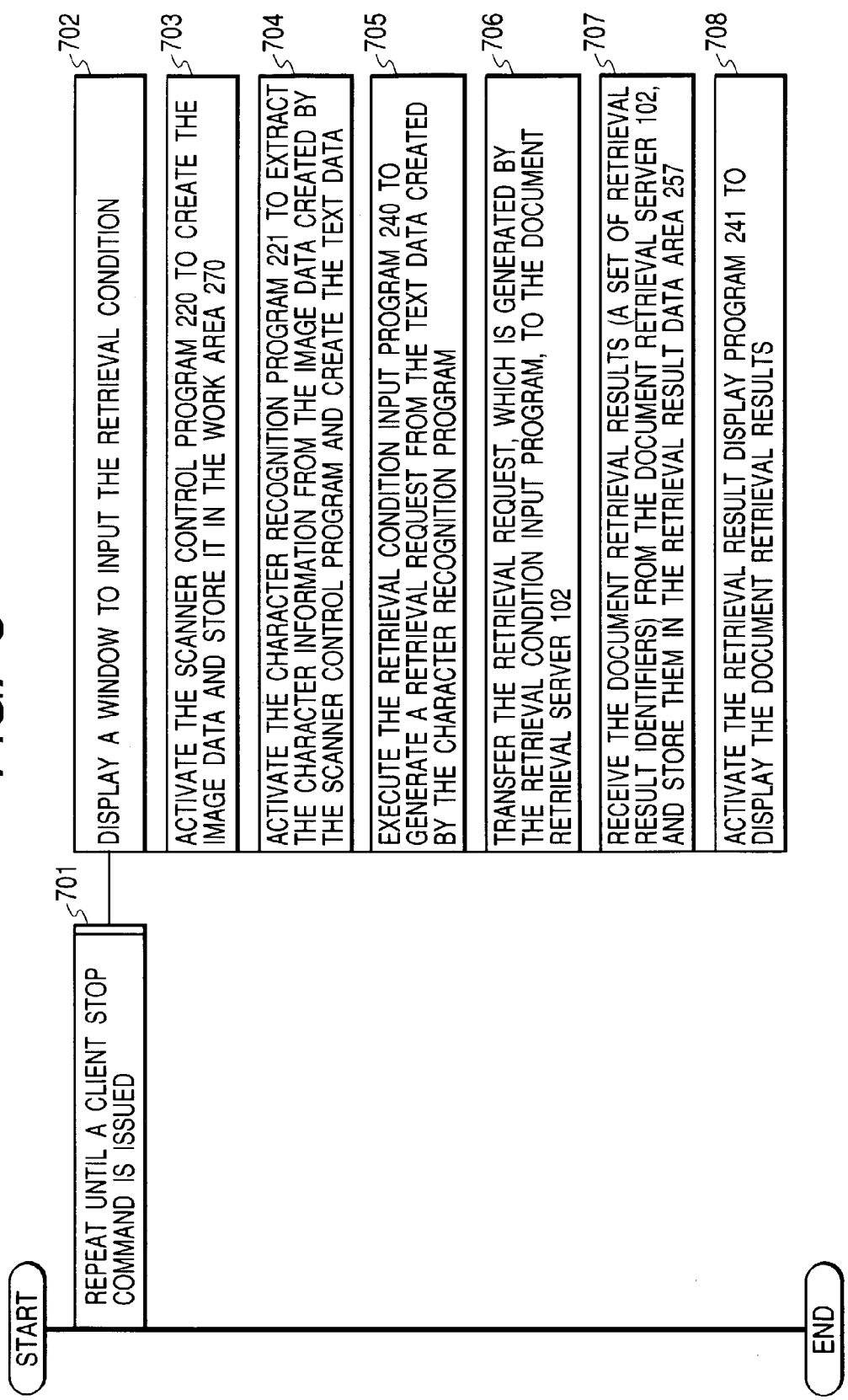
FIG. 8 is a PAD chart that outlines the steps to be performed by a retrieval client according to the first preferred embodiment.

The operating steps to be performed by the clients 103, 104 of the present embodiment will now be described with reference to FIG. 8. When started by a client startup or like command entry from the keyboard 202, the client control program 214 receives a document retrieval command from a user and enters a loop for processing the command (step 701). This loop continues until a client stop command is entered via the keyboard 202. The loop in step 701 repeats processing in steps 702 to 708 as described below.

In step 702, a window opens, prompting the user to interactively enter retrieval conditions. Step 703 is then performed to start the scanner control program 220, let the scanner 206 read the paper document to be set as a seed document, convert the paper document to image data, and store the image data in the work area 270. The paper document to be set as the seed document may contain charts and illustrations. In step 704, the character recognition program 221 is executed to extract character information from the image data generated in step 703. The extracted character information is stored in the work area 270 as text data. The employed character recognition technology is well known in the art and is therefore not described herein. In step 705, the retrieval condition input program 240 is executed to enter retrieval conditions while interactively communicating with the user, and set the text data stored in the work area as the seed document. The program then converts the retrieval conditions and seed document into a document retrieval request that can be interpreted by the document retrieval server 102.

In step 706, the above document retrieval request is transmitted to the document retrieval server 102 via the network 105. Instep 707, the program waits until the document retrieval server 102 returns a set of retrieval result data in response to the document retrieval request, and then receives the set of retrieval result data or the associated retrieval result identifier. In step 708, the retrieval result display program 241 is executed, using the above-mentioned set of retrieval result data or retrieval result identifier as the input, in order to make inquiries about the retrieval result data and display relevant information on screen while interactively communicating with the user.

Figure 9:
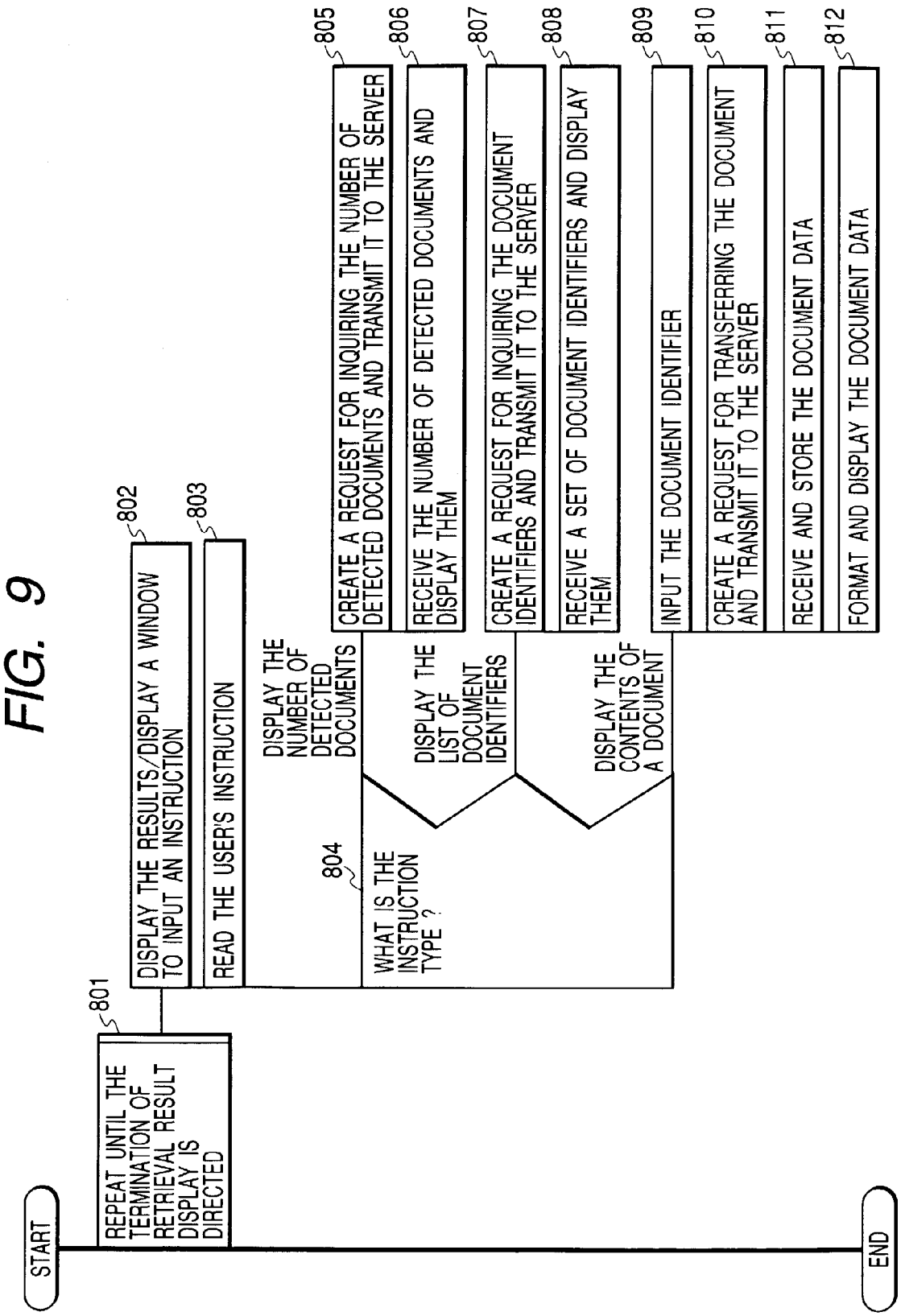
FIG. 9 is a PAD chart that outlines the steps to be performed by a retrieval result display program according to the first preferred embodiment.

When started by the client control program 214, the retrieval result display program 241, which is executed in step 708, immediately enters the loop in step 801 as indicated in FIG. 9. This loop repeatedly executes processing steps 802 to 812 as described below until a retrieval result display termination command is entered.

Within the loop in step 801 above, step 802 is first performed to open a window on the display 201, presenting a retrieval results and prompting the user to enter an instruction. Next, step 803 is performed to read the user-specified instruction that is entered from the above-mentioned window. In step 804, the program determines the type of the user-specified instruction and performs a branch in accordance with the determined type. More specifically, if the instruction calls for the display of the number of detected documents, the program branches to processing steps 805 and 806 as described below. If the instruction calls for the display of a document identifier list, the program branches to processing in steps 807 and 808 as described below. If the instruction calls for the display of the contents of a document, the program branches to processing in steps 809 to 812 as described below. When the processing steps are completed at a branch destination, the program returns to step 801 and resumes the above-mentioned loop.

In step 805, a detected document count inquiry request for inquiring about the number of detected documents is created and transmitted to the document retrieval server 102. In step 806, the detected document count transferred from the document retrieval server 102 in compliance with the above request is received to display the associated numerical value on the display 201.

In step 807, a document identifier inquiry request for inquiring about the document identifier list of detected documents is created and transmitted to the document retrieval server 102. Step 808 is then performed to receive a set of document identifiers that are transferred from the document retrieval server 102 in compliance with the above request, store the document identifiers contained in the set in the retrieval result data area 257, and list the document identifiers on the display 201.

Step 809 is performed to enter a document identifier for specifying the document to be displayed. Step 810 is performed to create a document transfer request for acquiring the document data about the document to be identified by the document identifier and transmit the created request to the document retrieval server 102. In step 811, the document data transferred from the document retrieval server 102 in compliance with the above request is received and stored in the retrieval result data area 257. In step 812, the stored document data is formatted and displayed on the display 201. In this instance, a reverse video display, coloring, or other highlighting process may be performed for characteristic character strings and other data contained in the document data. Further, the data to be displayed in this step may be either image data or text data.

Image data cannot be subjected to document processing but is readily legible and capable of presenting charts at the same time. Text data, on the other hand, can be subjected to document processing, but is poor in legibility due to the inclusion of erroneously recognized characters, and cannot present charts. After understanding the properties of these two types of document data, the user can selectively display either image data or text data. Since the information registered in the text file 250 and image file 251 is managed in tabular form within the document management information 253, necessary data can easily be acquired.

The document registration and document retrieval processes of the first embodiment will now be described with concrete examples.

First of all, the document registration process will be described using concrete examples and in accordance with the processing steps performed by the document registration subsystem 102.

Figure 10:
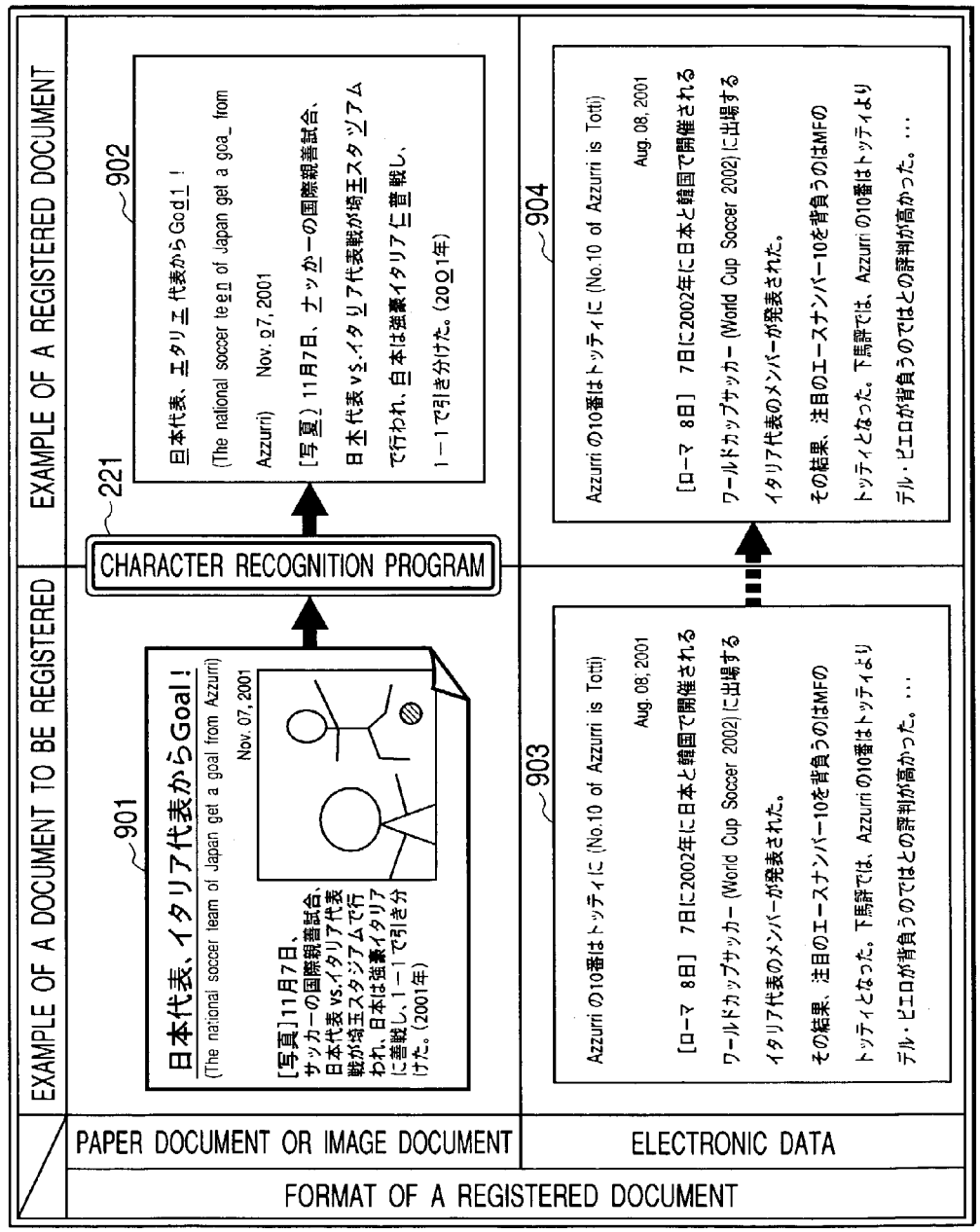
FIG. 10 shows concrete examples of a document to be registered and the contents of a document to be registered according to the first preferred embodiment.

FIG. 10 shows an example of a paper document 901 for use in document registration. The paper document 901 to be registered not only includes the text data shown in FIG. 10 but also carries a photograph related to the contents. The text data 902 shown in FIG. 10 is an example of data that can be obtained after character recognition steps 302 and 303 are performed by the document registration subsystem 102.

The character recognition process shown in the example indicates that the character strings "サッカー", "Goal", and "team" are erroneously recognized as "ナッかー", "God 1", and "teen", respectively. As regards the text data 902 shown in FIG. 10, erroneously recognized characters are underlined. The document registration subsystem 102 creates index data from the text data 902, associates the text data with the image data generated in step 302, and then registers the data in the respective storage areas (steps 304 to 307). In the present embodiment, no process is performed on the text data that is extracted by means of character recognition.

FIG. 10 also presents an example of electronic data 903 for use in registering a document. The document shown in the example is text data, that is, an electronic version of the document. Therefore, the document registration subsystem 102 does not have to perform step 302 or 303. It sets image data as empty data, associates the text data with the image data, and then registers the data in their respective storage areas (text data 904 in FIG. 10). Although the present embodiment assumes that the image data will be registered as empty data when electronic data is to be registered, the electronic data may alternatively be turned into image data before registration.

The above process is repeatedly executed until there, are no more registered documents. A plurality of text data, image data, index data, and document management information generated by the above process are then transferred to the document retrieval server 102 as a database update request.

Next, the document retrieval process will be described using concrete examples and in accordance with the processing steps performed by the document retrieval server 102 and retrieval clients (103 and 104).

Figure 11:
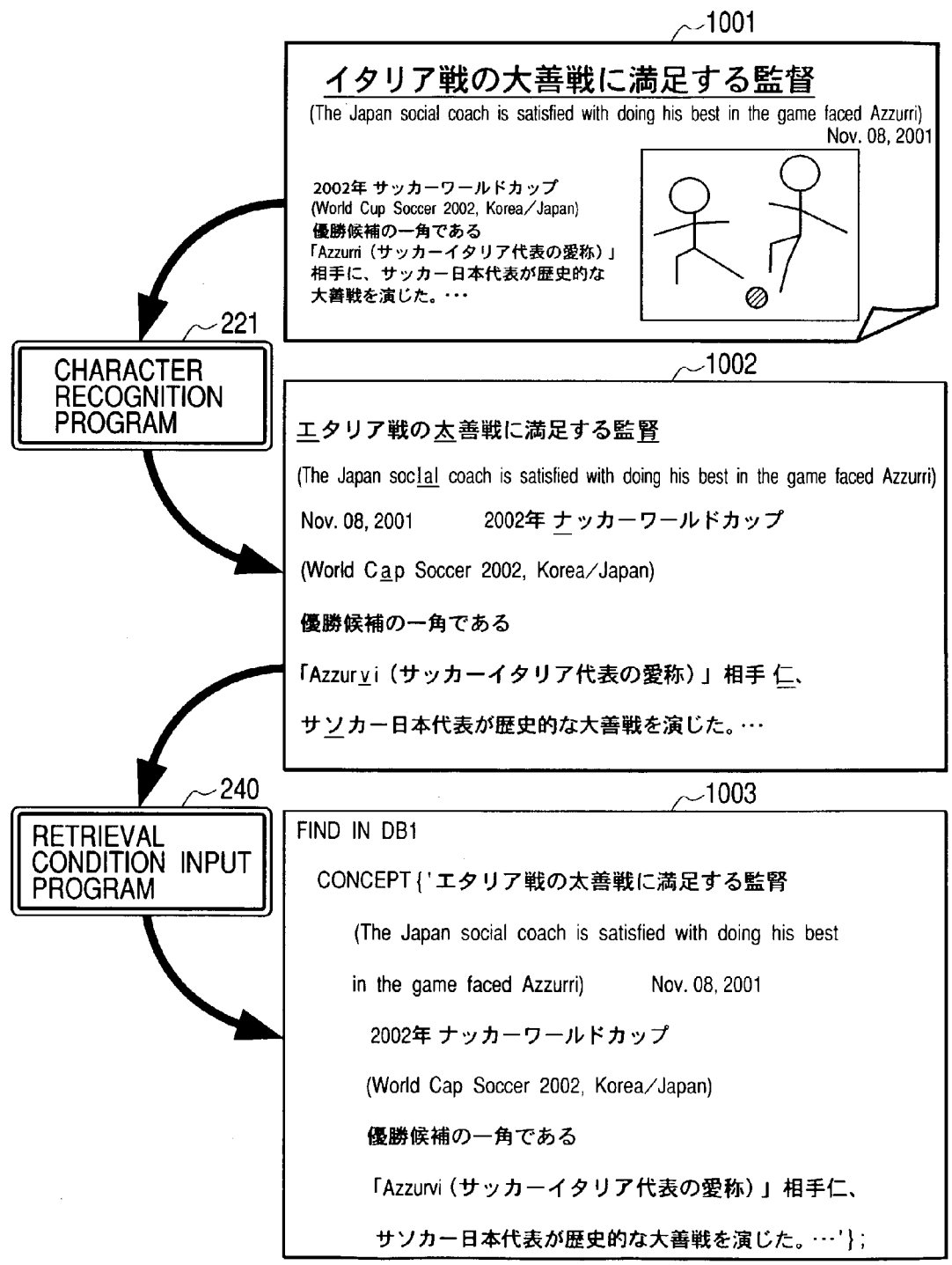
FIG. 11 shows an exemplified seed document setup process that is performed for document retrieval according to the first preferred embodiment.

FIG. 11 shows an example of a paper document 1001 that can be set as the original document for similar-documents retrieval, that is, a seed document. The paper document 1001 carries the contents text shown in FIG. 11 and an illustration associated with the contents. The text data 1002 is an example of text data that is obtained after character recognition steps 703 and 704 are performed by a retrieval client (103 or 104). The character recognition process shown in the example indicates that the character strings "サッカー", "Cup", "Azzurri", "soccer" are erroneously recognized as "サソカー", "Cap", "Azzurvi", and "social", respectively. As regards the text data 1002 shown in FIG. 11, erroneously recognized characters are underlined. FIG. 11 also shows an example of a retrieval request 1003, which is generated using the retrieval condition input program 240. This retrieval request is a conditional expression for searching database DB1 to retrieve documents whose contents are similar to those of text data 1002. The retrieval request is transmitted to the document retrieval server 102.

Upon receipt of this retrieval request, the document retrieval server 102 performs processing steps 406 and 407 to extract characteristic character strings from a seed document. Table 1101 in FIG. 12 indicates some examples of characteristic character strings that are generated in compliance with the retrieval request 1003 shown in FIG. 11. To perform a similar-documents retrieval process, it is necessary to select the characteristic character strings for use in retrieval from those shown in table 1101. Various well-known methods can be used for characteristic character string selection, including the method for selecting frequent characteristic character strings in a seed document, the method for selecting characteristic character strings that are not frequent in the documents to be retrieval, the method for selecting characteristic character strings in accordance with the role (subject, predicate, or object), and the method for setting the importance (weight value) of each characteristic character string by combining the above methods. For the sake of convenience, however, the present embodiment sets characteristic character strings having a weight setting of 5.0 or higher as the characteristic character strings for retrieval.

Figure 12:
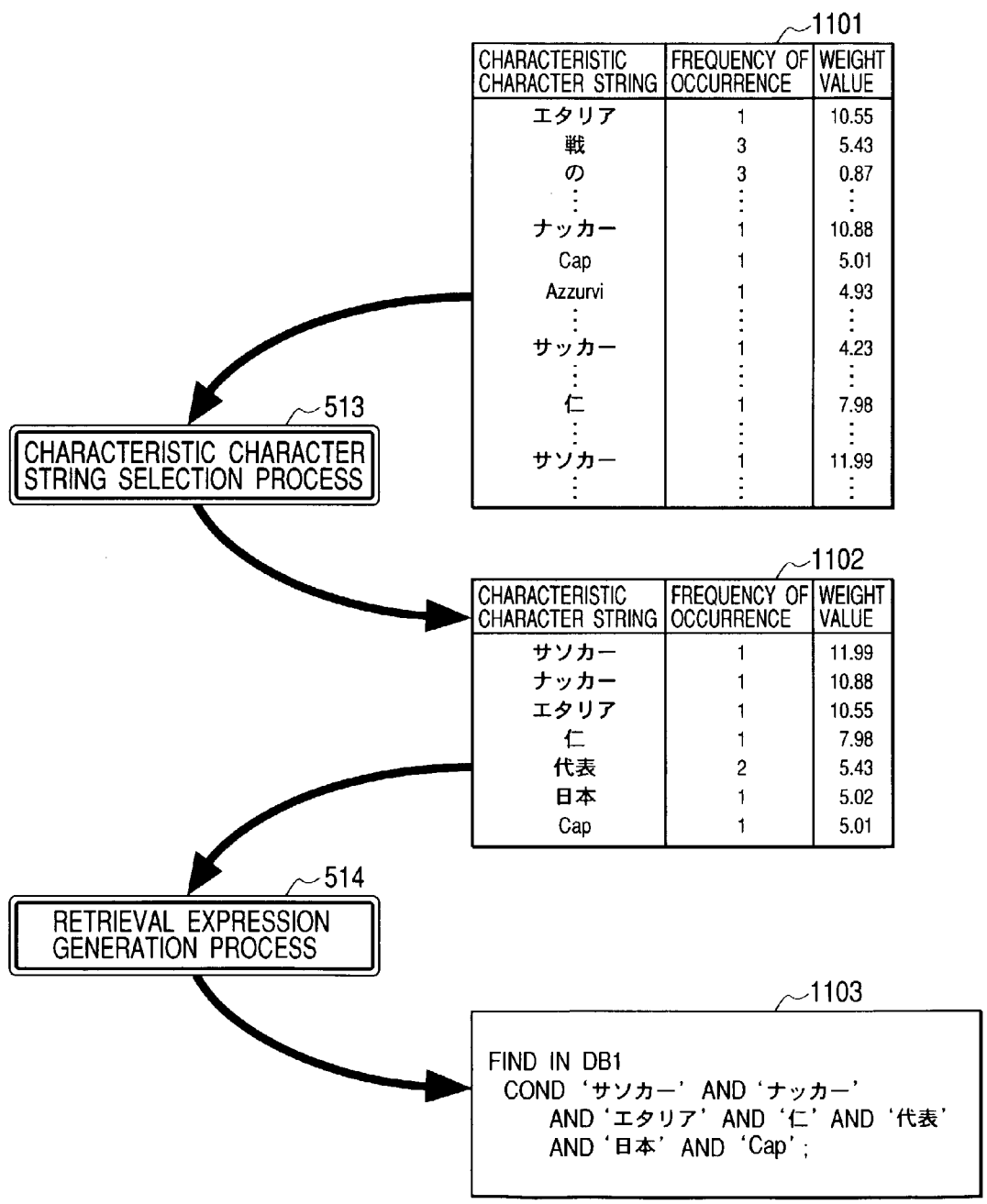
FIG. 12 illustrates a concrete example in which characteristic character strings are extracted from a designated seed document to generate a retrieval conditional expression for document retrieval according to the first preferred embodiment.

Prior Art 1 uses selected characteristic character strings to generate a retrieval expression and perform a retrieval process. Table 1102 shown in FIG. 12 indicate characteristic character strings selected by Prior Art 1. The retrieval conditional expression 1103 shown in FIG. 12 is generated by Prior Art 1. This retrieval conditional expression searches database DB1 to retrieve documents that contain the character strings "サッカー", "サッカー", "エタリア", "仁", "代表(representatives)", "日本(Japan)", and "Cap". Here, "サソカー" is produced instead of "サッカー" because of the second character "ツ" erroneously recognized as "ソ", while "サッカー" is produced because of the first character "サ" erroneously recognized as "ナ". In addition, "エタリア" is produced instead of "イタリア(Italy)" because of the first character "イ" erroneously recognized as "エ". If the retrieval process is performed in this manner, inadequate retrieval may result because only the character "仁" is hit within document 902 shown in FIG. 10 and only the characteristic character string "代表" is hit within document 903 shown in the same figure. If the characteristic character strings for use in retrieval are ORed for retrieval expression generation, many unnecessary documents containing the character string "日本を代表する古墳仁徳天皇陵(Nintoku Emperor's tomb, a representative Japanese burial mound)", wherein "仁" is the first character of "仁徳" which is the name of Emperor Nintoku, or "The FDNY's Cap Sold Out" are hit, only the character string "仁" is hit within document 902 shown in FIG. 10, and only the character string "代表" is hit within document 903. The character "に" can be erroneously recognized as "仁" since both character have a vertical line on the left side and two horizontal lines on the right side. Therefore, documents 901, 902, 903, and 904 will be ranked considerably low when a retrieval result is displayed, and cannot readily be identified as similar documents.

Figure 13:
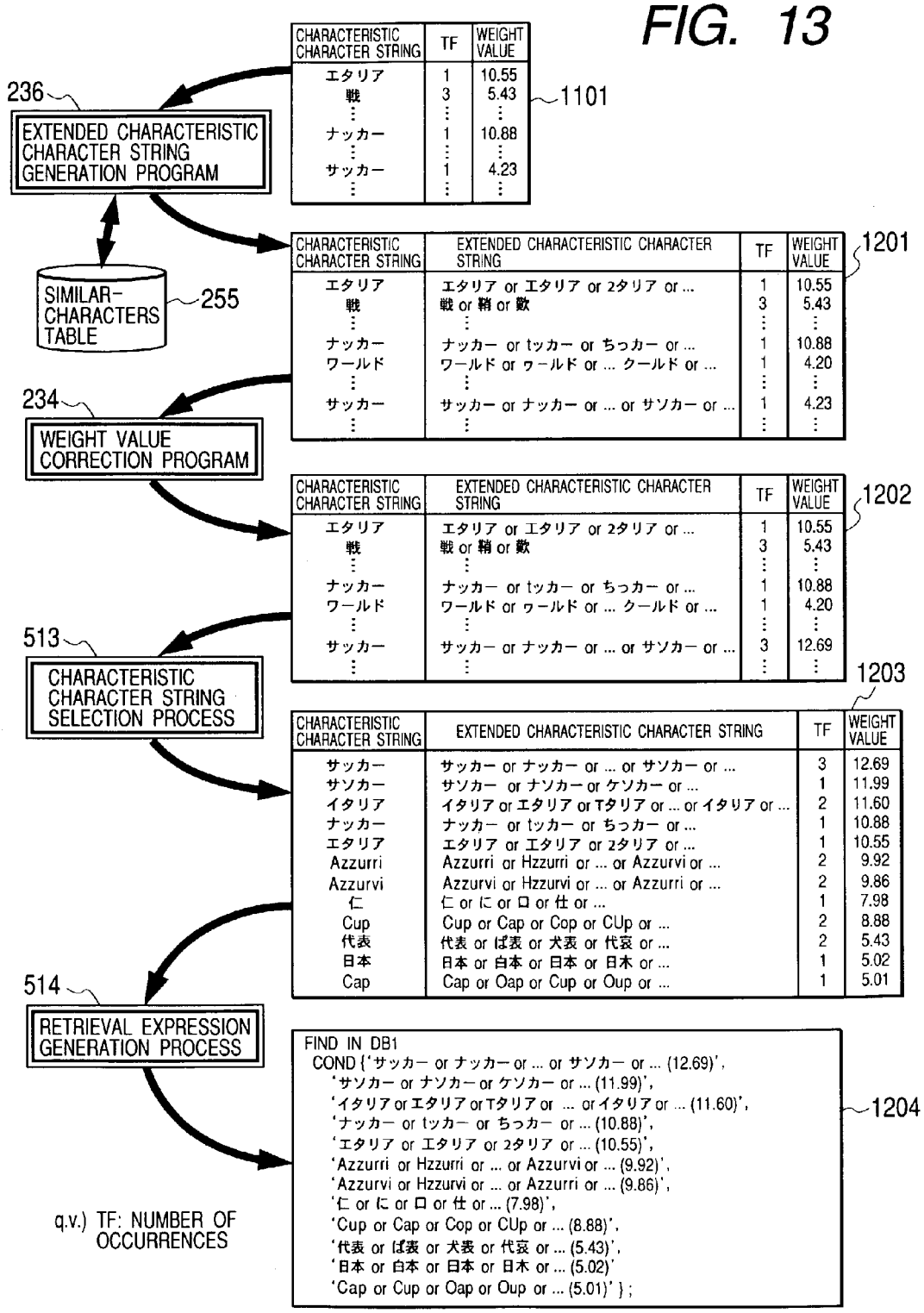
FIG. 13 shows an exemplified process that is performed to correct extracted characteristic character strings according to the first preferred embodiment.

In relation to the process shown in FIG. 12, the present embodiment performs a process for correcting the characteristic character strings and the weight values for use in the selection of retrieval characteristic character strings as indicated in FIG. 13.

To cope with erroneously recognized characters in the seed document and the documents targeted for retrieval, the present embodiment develops the characteristic character strings (table 1101), which are generated by the similar-documents retrieval program 227, into character strings that are highly likely to be erroneously recognized. For such development, the similar-characters table 255 is used. When the extended characteristic character string generation program 236 is applied, the character string "サッカー", for example, is developed into "サッカー or ナッカーor . . . or サソカーor . . . or サッかーor . . . ", wherein "サッかー" is produced instead of "サッカー" because of the third katakana character "カ" erroneously recognized as the hiragana character "か". "か" is a type of character different from "カ" though they are similar in shape and pronounced the same. The character string "Cap" is developed into "Cap or Cup or Oap or Oup or . . . " (table 1201 in FIG. 13). This development method will not be detailed herein because it is publicly disclosed by Prior Art 2.

Next, the developed characteristic character strings (extended characteristic character strings) are used to correct the weight values for the characteristic character strings, that is, to correct a parameter for use in weight value setup (weight value correction program 234). For the sake of convenience, the present embodiment uses the frequency of characteristic character string occurrence in the seed document as a parameter for the method of characteristic character string weight value setup. For example, the character string "サッカー" appears only once in document 1002 in FIG. 11. However, when the extended characteristic character string "サッカー or ナッカーor . . . or サソカーor . . . or サッかーor . . . " is used for the character string "サッカー", the occurrence count can be changed to 3, which represents the correct frequency of occurrence. In accordance with this corrected parameter, the extended characteristic character string weight value is determined and then set as a characteristic character string candidate for use in retrieval (see the "サッカー" section in table 1202 in FIG. 13).

The characteristic character string candidates, which are set as described above for use in retrieval, are first sorted in descending order of weight values. The characteristic character string candidates having a weight value greater than a predetermined threshold value are then selected as the characteristic character strings for use in retrieval. For convenience' sake, the present embodiment selects characteristic character strings having a weight value of 5.0 or greater as the characteristic character strings for use in retrieval. The characteristic character strings for use in retrieval, which are selected according to the above setup method, are shown in table 1203 in FIG. 13. The retrieval expression generated by the present embodiment is presented as a retrieval expression 1204 in FIG. 13.

When compared to table 1102 shown in FIG. 12, which presents characteristic character strings extracted by Prior Art 1, table 1203 in FIG. 13 indicates that the character strings essential for document retrieval, such as "サッカー", "Azzurri", and "Cup", are extracted. Therefore, the characteristic character strings necessary for document retrieval can be extracted by performing the above process.

The retrieval expression 1204 in FIG. 13 consists of extended characteristic character strings and their weight values. In other words, the retrieval expression 1204 is a retrieval conditional expression for retrieving documents that contains any of the extended characteristic character strings. Since extended characteristic character strings are used instead of characteristic character strings, recognition errors existing in the documents targeted for retrieval can be tolerated.

In relation to the characteristic character string "サッカー", for example, document 902 in FIG. 10 does not contain the word "サッカー". However, when an extended characteristic character string is used, the character string "ナッかー" is hit so that inadequate retrieval can be avoided. Further, a secondary effect can also be produced. More specifically, even if "Cup" is erroneously recognized as "Cap", correct character string retrieval can be achieved by extending a characteristic character string in situations where it is highly probable that the characters "u" and "a" are erroneously interchanged. As a result, high-accuracy retrieval can be accomplished for text data 903, which is shown in FIG. 10 and free from internal recognition error.

More specifically, when the retrieval expression 1204 in FIG. 13 contains the characteristic character strings "ナッかー", "エタリア", "イタリア", "Azzurri", "仁", "代表", "日木", and "白本", which contain erroneously recognized characters, it can retrieve document 902 shown in FIG. 10 because it matches these characters, which exist in document 902. Here, "ナッかー" is produced instead of "サッカー" because of the third character "カ" erroneously recognized as "か"; "エタリア" and "イタリア" are produced instead of "イタリア" because of the first character "イ" recognized as "エ" and the third character "リ" recognized as "り", respectively; "仁" is an erroneously recognized character instead of hiragana character "に"; and "日木" and "白本" are produced instead of "日本(Japan)" because the second character "木" has lost the lower horizontal line of "本" and the first character "白" has erroneously a short bar laid on "日", respectively. Further, when the retrieval expression 1204 in FIG. 13 contains the characteristic character strings "サッカー", "イタリア", "Azzurri", "Cup", "代表", and "日本", which contain no erroneously recognized character strings, it hits the character strings existing in document 904 in FIG. 10 and therefore can retrieve document 904.

With the characteristic character strings extracted or set in the above processing steps entered, the similar-documents retrieval program is executed. After execution, the extracted documents are sorted in descending order of similarity and returned to a requesting retrieval client as a set of retrieval result data. The retrieval client receives the set of retrieval result data and executes the retrieval result display program 241 to display the retrieval result.

Further, if a document searched for by the user is found, the contents of that document are displayed in accordance with its document identifier. When the retrieval result display program 241 is used to display the contents, it is possible to output image data such as document 901 in FIG. 10 and document 1001 in FIG. 11 or recognition-error-free text data such as document 903 in FIG. 10. Therefore, the contents can be read without being affected by any character recognition problem. Further, when the contents of a document need to be processed, it is possible to display text data such document 902 in FIG. 10, document 1002 in FIG. 11, and document 903 or 904 in FIG. 10.

As described above, the present embodiment makes it possible to register a target document simply by registering image data and text data extracted from the image data subjected to character recognition. Therefore, a target document can easily be registered by a user. Further, even if the same characteristic character string exists as different character strings in a seed document and the documents targeted for retrieval due to the use of a character recognition technology, high-accuracy document retrieval can be achieved, without having to pay attention to characteristic character string recognition errors, by separately performing the process for correcting characteristic character strings extracted from a seed document and the process for tolerating erroneously recognized characters existing in the documents targeted for retrieval.

When creating extended characteristic character strings, the present embodiment tolerates erroneously recognized characters existing in the documents targeted for retrieval by referencing the similar-characters table that is created in units of one character. However, if short characteristic character strings are extracted by the present embodiment, the number of retrieved documents that the user does not intend to retrieve (hereinafter referred to as retrieval noise) increases when a retrieval process is performed using extended characteristic character strings developed into words that are likely to incur recognition error.

If, for instance, "仁" is extracted as a characteristic character string, its extended characteristic character string is "仁 or 仁 or 口 or 仕 or . . . ". When this extended characteristic character string is used for document retrieval, documents containing an irrelevant characteristic character string such as "に" or "口 (mouth)" will also be presented as a retrieval result. Another example is the character string "C language". The extended characteristic character string for "C" in "C language" is "C or c or 0 or O or . . . ". Therefore, the obtained result includes irrelevant characteristic character strings such as "0 (zero)", "(c)" for indicating a heading within a document, and "Blood type: O(oh)". Consequently, the amount of retrieval noise increases, thereby decreasing the retrieval accuracy.

To solve the above problem, an additional step for changing the extended characteristic character string generation method can easily be furnished, before the present embodiment's processing in steps 506 to 509 in FIG. 5, that is, before the execution of the extended characteristic character string generation program 236 of the present embodiment, in order to judge whether or not to generate extended characteristic character strings in accordance with the length of an entered retrieval character string and execute the extended characteristic character string generation program 236 only when such character string generation is to be conducted.

A second preferred embodiment of the present invention will now be described with reference to the drawings. The second embodiment employs the same system configuration as the first embodiment described above. In the second embodiment, however, the document retrieval server 102 uses a different correction method for characteristic character strings. Therefore, the result of characteristic character string selection for use in retrieval differs from the result produced by the first embodiment.

A concrete example of characteristic character strings (table 1203 in FIG. 13) selected by the first embodiment will now be reviewed. In table 1203, the character string "仁" is generated when the character string "に" is erroneously recognized. Intrinsically, the character string "に" does not have a particular meaning within a document as is the case with the character strings "は", "が", "a", and "the". Therefore, if the character string "に" is used as a characteristic character string for document retrieval purposes, a large number of irrelevant documents will be retrieved. If the character string "仁" is set as a characteristic character string although it is generated when the character string "に", which should not be set as a characteristic character string, is erroneously recognized, an irrelevant document containing the character string "日本を代表する古墳仁徳天皇陵. . . (Nintoku Emperor's tomb, a representative Japanese burial mound . . . )" will be retrieved to reduce the retrieval accuracy.

In the second embodiment, extracted characteristic character strings unnecessary for document retrieval can be eliminated to increase the document retrieval accuracy.

Figure 14:
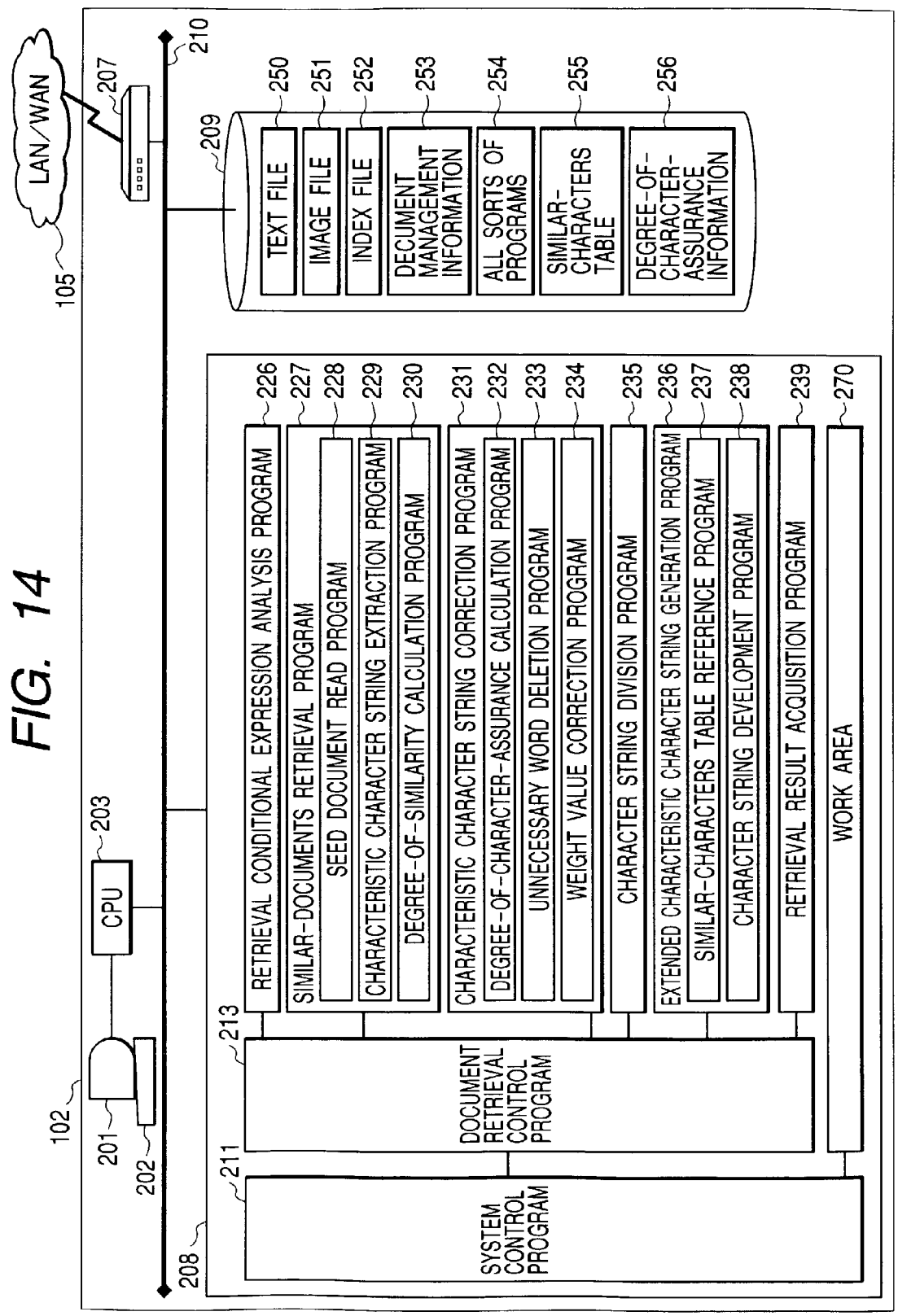
FIG. 14 shows the configuration of a document retrieval server of a second preferred embodiment.

The document retrieval server 102 of the second embodiment will now be described in detail. FIG. 14 shows how the document retrieval server 102 of the present embodiment is configured. The hardware configuration of the document retrieval server 102 shown in FIG. 14 is the same as indicated in FIG. 1, which depicts the first embodiment. However, the main memory 208 retains a degree-of-character-assurance calculation program 232 and an unnecessary word deletion program 233 in addition to the programs retained for the first embodiment. Further, the hard disk drive 209 has an area allocated as a degree-of-character-assurance information 256 in addition to the areas allocated for the first embodiment.

The characteristic character string correction program 231 comprises a degree-of-character-assurance calculation program 232, an unnecessary word deletion program 233, and a weight value correction program 234. Further, it calls the extended characteristic character string generation program 236 as is the case with the first embodiment.

The unnecessary word deletion program 233 eliminates characteristic character strings unnecessary for document retrieval from the characteristic character strings extracted from a seed document so as to obtain the characteristic character strings necessary for document retrieval.

The degree-of-character-assurance calculation program 232 calculates the probability with which the characteristic character strings extracted from a seed document consist of correct character strings.

Figure 15:
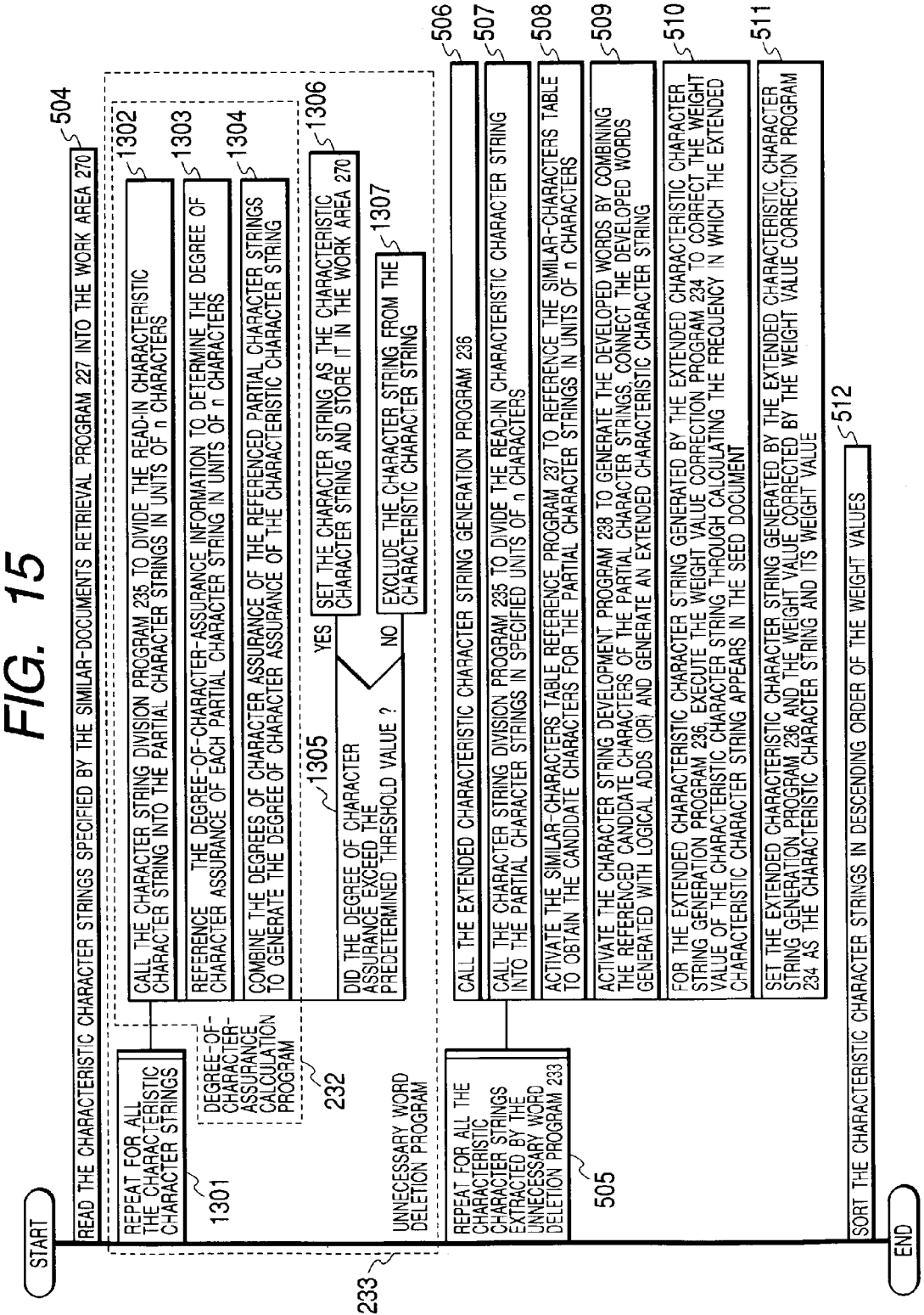
FIG. 15 is a PAD chart that outlines the steps to be performed by a characteristic character string correction program according to the second preferred embodiment.

FIG. 15 is a PAD chart that outlines the processing to be performed by the characteristic character string correction program 231 according to the second embodiment. The program illustrated in FIG. 15 differs from the characteristic character string correction program 231 of the first embodiment shown in FIG. 5 in that the process (steps 1301 to 1307) for checking all the characteristic character strings and removing the characteristic character strings unnecessary for document retrieval is performed between the instant at which the characteristic character strings specified by the similar-documents retrieval program 227 are read and the instant at which the weight values for generated characteristic character strings are corrected. The characteristic character string correction program 231 of the second embodiment will now be described with reference to FIG. 15.

The similar-documents retrieval program 227 calls the characteristic character string correction program 231. When called, the characteristic character string correction program 231 first stores the characteristic character strings specified by the similar-documents retrieval program 227 in the work area 270 (step 504).

Upon completion of step 504, the program enters a loop to read and process characteristic character strings, one by one (step 1301). Thanks to this loop process, characteristic character strings necessary and sufficient for document retrieval can be extracted even if erroneously recognized characters are contained in the seed document and/or the documents targeted for retrieval, and at the same time, characteristic character strings unnecessary for document retrieval can be removed from the characteristic character strings for use in document retrieval. The loop of step 1301 continues until all the characteristic character strings stored in step 504 are read. The loop of step 1301 executes the unnecessary word deletion program 233 to repeat the process (steps 1302 to 1307) for removing the characteristic character strings unnecessary for document retrieval.

In step 1302, the degree-of-character-assurance calculation program 232 is started, and then executed using the characteristic character string read in step 1301 as the input. The degree-of-character-assurance calculation program 232 calls the character string division program 235 using the read characteristic character string as the input and divides the characteristic character string into partial character strings in specified units of n characters (n >1) (step 1302).

Further, the degree-of-character-assurance information stored in the degree-of-character-assurance information area 256 is referenced to set a degree of character assurance for each partial character string (step 1303).

Finally, the degree of character assurance is set for the entire characteristic character string by combining the degrees of character assurance set for the partial character strings in order to output the degree of character assurance for an entered characteristic character string (step 1304). Steps 1302 to 1304 are the processing steps performed by the degree-of-character-assurance calculation program 232.

After completion of step 1304, step 1305 is performed to check whether a predetermined threshold value is exceeded by the degree of character assurance that is output earlier in step 1304.

The characteristic character strings are set for use in document retrieval and stored in the work area 270 only when the threshold value is exceeded by the degree of character assurance that is output earlier in step 1304 (step 1306).

If the threshold value is not exceeded by the degree of character assurance that is output earlier in step 1304, the program does not set the associated characteristic character string as a characteristic character string for use in document retrieval and stores an empty list or nothing in the work area 270 (step 1307).

Processing in steps 1301 to 1307 is performed by the unnecessary word deletion program 233 of the present embodiment. Processing in steps 505 and beyond will not be described herein because they are the same as those of the first embodiment described earlier.

Figure 16:
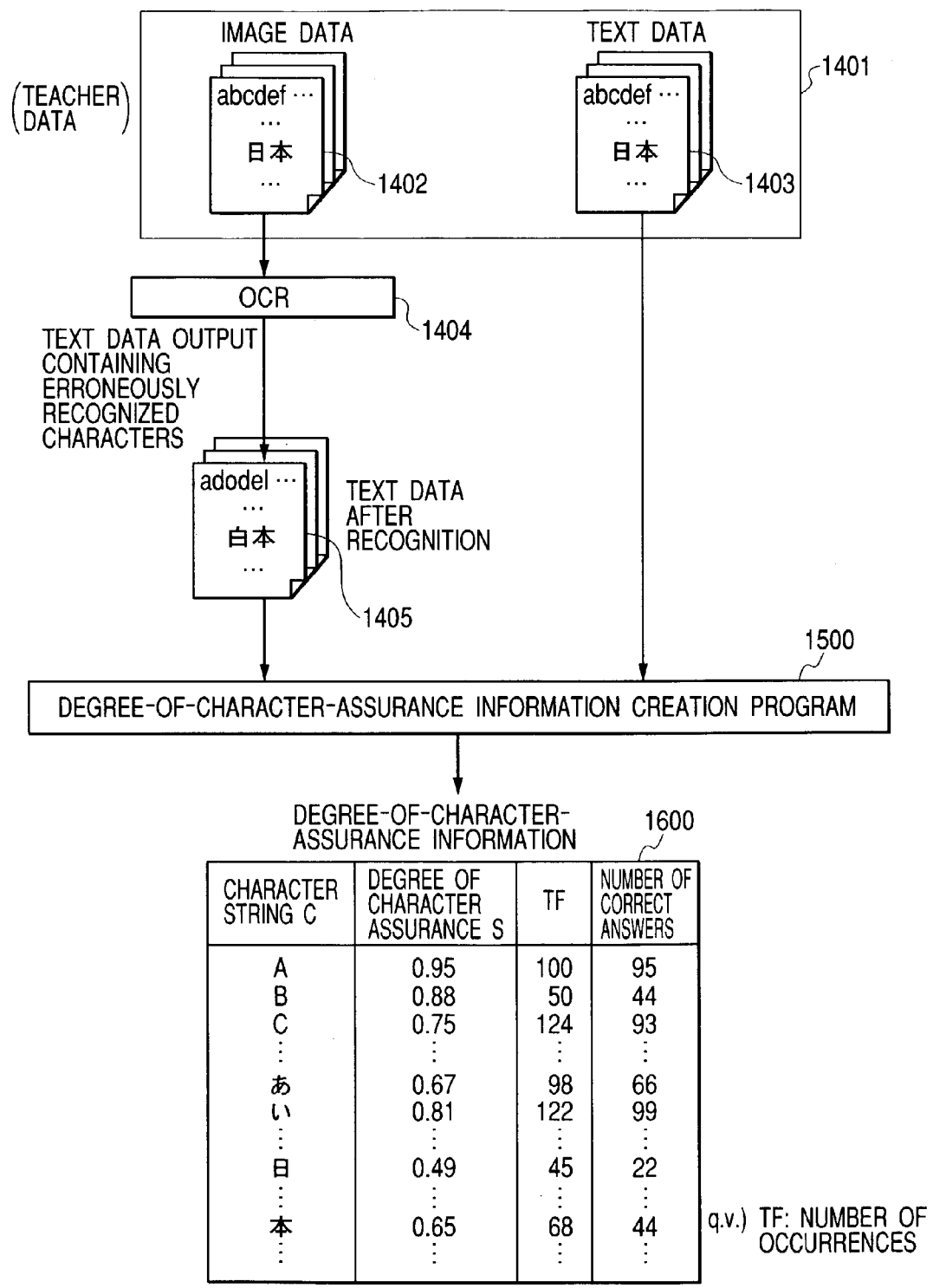
FIG. 16 is a first schematic diagram that illustrates how to prepare degree-of-character-assurance information.

The present embodiment requires a step for dividing read characteristic character string in units of n characters. However, the value n can be regarded as a considerably great value (n=∞) depending on the later-described method for creating degree-of-character-assurance information in order to use a processing method in which characteristic character strings are not divided into partial character strings. If such a method is employed, step 1302 can be omitted. An example of degree-of-character-assurance information for use with the degree-of-character-assurance calculation program 232 is shown in table 1600 in FIG. 16, and the detailed description of the method for degree-of-character-assurance information creation will be given later.

The following three methods can be assumed as a method for calculating the degree of character assurance when the partial character strings for characteristic character string are handled in step 1304. Any of these three methods can be used. For the following description of the three methods, it is presumed that a certain characteristic character string is divided into m partial character strings Ci (0≦i<m) in step 1302 and that the degree of character assurance of each partial character string is set to S (Ci) (0≦i<m).

(1) The degrees of character assurance of the partial character strings are multiplied together according to Equation 1 below to determine the probability with which correct characters are arranged for the entire characteristic character string. The calculated probability is then set as the characteristic character string's degree of character assurance.

$$S = \prod_{i=0}^{m-1} S(Ci) \qquad \text{(Equation 1)}$$

(2) The degrees of character assurance of the partial character strings are averaged according to Equation 2 below to determine the average probability with which correct characters are arranged for the entire characteristic character string. The calculated average probability is then set as the characteristic character string's degree of character assurance.

$$S = \frac{\sum_{i=0}^{m-1} S(Ci)}{m} \qquad \text{(Equation 2)}$$

(3) Equation 3 below is used with the degree of character assurance of each partial character string to calculate the probability with which the characteristic character string contains correct characters. The calculated probability is then set as the characteristic character string's degree of character assurance.

$$S = 1 - \prod_{i=0}^{m-1} (1 - S(Ci)) \qquad \text{(Equation 3)}$$

The present embodiment performs document retrieval processing using the degree-of-character-assurance information. The degree-of-character-assurance information represents the calculated probability with which the recognized characters of a partial character string, which is in units of n characters (n≧1), are correct. Various methods can be assumed as a method for creating the degree-of-character-assurance information. Seven methods for degree-of-character-assurance information creation are exemplified below.

(1) The first method for creating the degree-of-character-assurance information is to prepare teacher data for degree-of-character-assurance information creation and define the degree-of-character-assurance information in advance. FIG.

16 is a schematic diagram that outlines the first method for creating the degree-of-character-assurance information indicated in FIG. 14. The teacher data stores the image data and the text data corresponding to the contents of the associated document. The image data is read by an OCR device to achieve character recognition. The resultant output data is compared against the text data, which is prepared as the teacher data, to calculate the probability with which the characters are correctly recognized (correct-answer probability). The degree-of-character-assurance information creation program 1500 is executed to calculate the correct-answer probability. The calculated correct-answer probability is set as the degree of character assurance S(i) and stored in the degree-of-character-assurance information area.

(2) The second method for creating the degree-of-character-assurance information is to use a compiled similar-characters table. As is the case with method (1) this method also requires that the degree-of-character-assurance information be predefined. FIG. 17 schematizes the second method for creating the degree-of-character-assurance information indicated in FIG. 14. In a certain case, the similar-characters table may store character strings, their candidate characters for recognition, and weight values (or recognition probability values) together. In such a case, the correct-answer probability of recognized character string can be calculated by setting the weight value as the recognition probability value and applying Bayes' theorem. An example of such a calculation method is shown below. When it is assumed that the event in which a character within correct text is i is Ai and that the event in which character output corresponding to the text character obtained as a result of character recognition is j is Bj, the probability Pr(Ai|Bj) with which character j (event Bj) obtained as a result of character recognition by an OCR device is character i (event Ai) within the correct text can be calculated by Equation 4 according to Bayes' theorem:

$$\Pr(Ai \mid Bj) = \frac{\Pr(Ai) \times \Pr(Bj \mid Ai)}{\sum_{k=1}^{n} \{\Pr(Ak) \times \Pr(Bj \mid Ak)\}} \quad \text{(Equation 4)}$$

Concisely, the calculation is performed to determine the probability (correct-answer probability) Pr(Ai|Bi) with which character i (event Bi) obtained as a result of character recognition by an OCR device is character i (event Ai) within correct text. The calculated correct-answer probability is set as the degree of character assurance S(i) and stored in the degree-of-character-assurance information area for information creation purposes.

(3) The third method for creating the degree-of-character-assurance information is to assume that characters (or character strings) infrequently appearing in the text file 250 targeted for document retrieval are likely be erroneously recognized characters. When this method is employed, it is not necessary to create new degree-of-character assurance information so that no degree-of-character assurance information apparently exists. If this creation method is used, the statistical information derived from the text file 250, which stores the documents targeted for retrieval, corresponds to the degree-of-character assurance information. Therefore, it is not necessary to create the degree-of-character-assurance information beforehand. The degree of character assurance is set while referencing the statistical information that is derived from the text file 250 about the characteristic character string extracted by the characteristic character string extraction program 229 at the time of document retrieval.

(4) The fourth method for creating the degree-of-character-assurance information is to set the degree of character assurance in accordance with the recognized character type. The character recognition performance delivered by an OCR device depends on the character type. Therefore, there is a fact that the recognition accuracy varies with the character type. This creation method makes use of the tendency of recognition achieved by an OCR device. As is the case with method (3), this creation method also eliminates the necessity for creating the degree-of-character-assurance information beforehand.

(5) The fifth method for creating the degree-of-character-assurance information is to formulate a judgment in accordance with the length of a characteristic character string extracted from recognized text data. When a characteristic character string is extracted, it is highly probable that the degree of character string recognition correctness increases with an increase in the character string length. This fifth creation method makes use of such a tendency. As is the case with method (3), this creation method also eliminates the necessity for creating the degree-of-character-assurance information beforehand.

(6) The sixth method for creating the degree-of-character-assurance information is to utilize the recognition probability information that is output by an OCR device when the document to be set as a seed document is subjected to character recognition. When an OCR device performs a character recognition process, it outputs some candidate characters for recognition. Since some OCR devices output the information about recognition probability at the same time, this sixth method sets that information as the degree of character assurance. Even if the employed OCR device does not output the information about recognition probability, it outputs candidate characters in descending order of character shape similarity; therefore, the degree of character assurance can be set in accordance with the order of candidate character appearance. When this method is employed, it is possible to either set the degree of character assurance beforehand or calculate the degree of character assurance as needed for extracted character strings.

(7) The seventh method for creating the degree-of-character-assurance information is to utilize a word dictionary that has been used for morphological analysis or the like. More specifically, this method checks whether characteristic character strings extracted from a seed document exist in the word dictionary and concludes that the character strings existing in the word dictionary consist of correct characters. When this method is employed, the degree-of-character-assurance information is set by preparing a word dictionary. However, if the words "に" and "Cup" are erroneously recognized as "仁" and "Cap", respectively, by an OCR device, and "仁" and "Cap" are set as characteristic character strings while this method is used, the words "仁" and "Cap" are judged to be correct because they exist in the word dictionary. Therefore, the use of the degree-of-character-assurance information created by this method is not adequate for determining the degree of correctness of character strings that are judged to be correct.

For degree-of-character-assurance information creation, any of the above methods or a combination of one or more of the above methods may be used. When the degree-of-character-assurance information is to be prepared, it may be created on the server and directly stored on the hard disk drive 209. It may alternatively be created using a different machine, saved on a floppy disk or other portable storage media, and transferred to the hard disk drive 209. Another alternative is to directly read a floppy disk or other portable storage media that stores the degree-of-character-assurance information. Yet another alternative is to store the degree-of-character-assurance information transferred via the network 105 on the hard disk drive 209 or enter the degree-of-character-assurance information directly into the work area 270 within the main memory 208.

The document registration process of the present embodiment is the same as that of the first embodiment. The document retrieval process according to the second embodiment of the present invention will now be described using concrete examples.

As is the case with the first embodiment, the second embodiment assumes that the text data 1002 derived from a character recognition process for the paper document 1001 in FIG. 11 is to be set as a seed document. It also assumes that characteristic character strings are extracted from the seed document to generate table 1101 as is the case with the first embodiment. The processing performed thus far is the same as for the first embodiment. As a subsequent process, the second embodiment executes the unnecessary word deletion program 233 for the characteristic character strings existing in table 1101 in order to eliminate characteristic character strings irrelevant to document retrieval.

Figure 18:
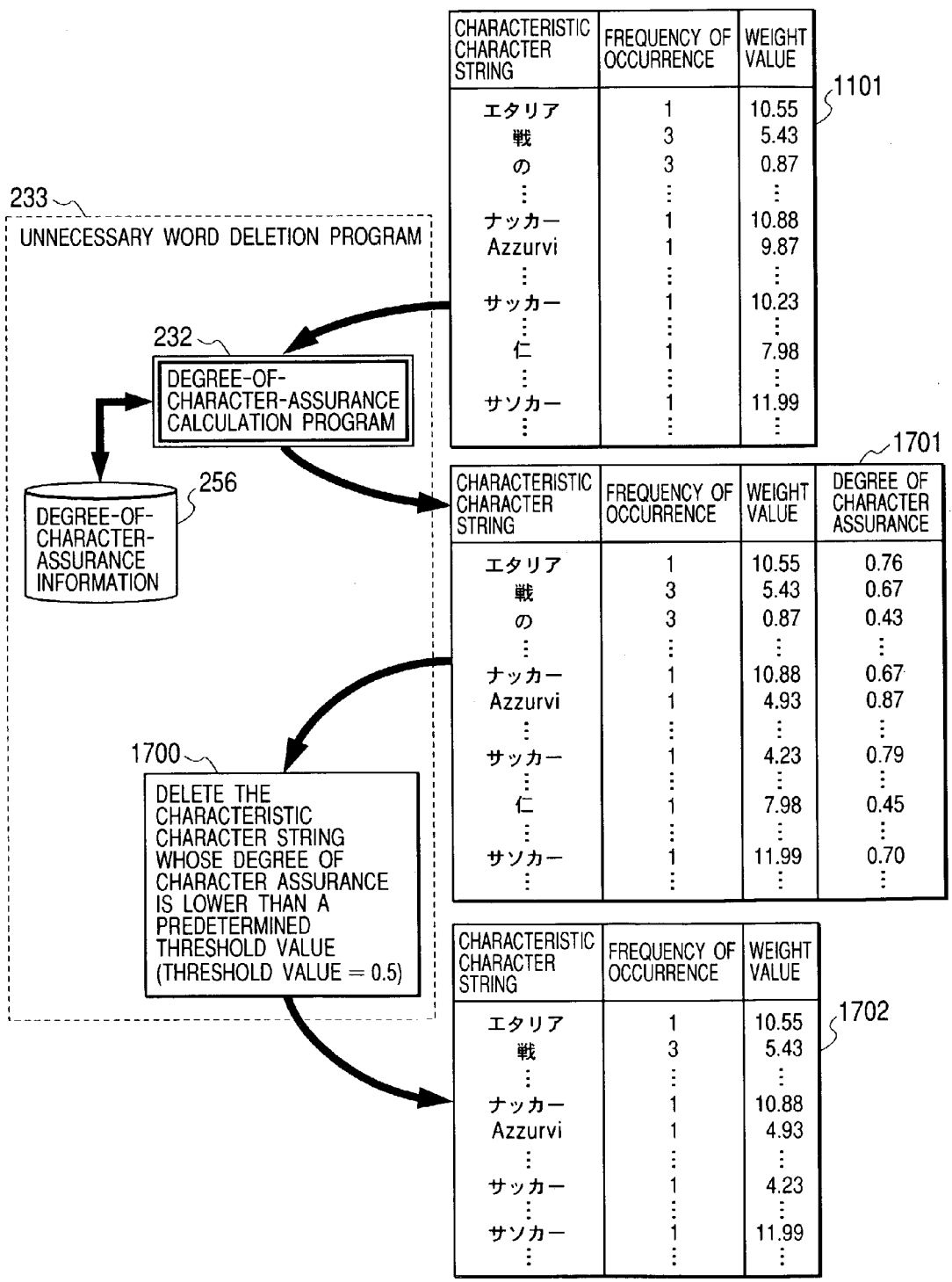
FIG. 18 illustrates an exemplified unnecessary word deletion program that is performed to correct extracted characteristic character strings according to the second preferred embodiment.

FIG. 18 illustrates an exemplified process for eliminating unnecessary characteristic character strings. The degree-of-character-assurance calculation program 232 is executed to calculate the degree of character assurance of each extracted characteristic character string while referencing the degree-of-character-assurance information 256 (table 1701). As a concrete example, the process for calculating the degree of character assurance concerning the character string "エタリア" will now be described. If, for instance, the probability with which katakana characters are correctly recognized is set at 30% no matter what katakana characters are read, and Equation 3, which is mentioned earlier for the description of a degree-of-character-assurance calculation method, is used to calculate the degree of character assurance S, the degree of character assurance of the character string "エタリア" is set at 0.76 as shown below:

$$S=1-(1-0.3)^4=0.7599 \qquad \text{(Equation 5)}$$

The present embodiment calculates the degree of character assurance of the whole characteristic character string using the degree of character assurance of each character. However, as described earlier, the degree of character assurance may be calculated in units of either one character or two or more characters. In the above calculation example, the degree of character assurance is set at 30% for all katakana character strings for the sake of convenience. However, as mentioned in the earlier description of a degree-of-character-assurance calculation method, the degree of character assurance may alternatively be set for various characters or character strings on an individual basis.

The degree of character assurance, which is calculated by the degree-of-character-assurance calculation program, is an index that indicates the probability with which the characteristic character string is correct character string. For example, this index indicates that the character string "エタリア" in the above example consists of correctly recognized characters with a probability of 76%. Therefore, it is highly probable that character strings having a low degree of character assurance may be erroneously recognized. Consequently, unnecessary characteristic character string can be eliminated by removing the one that exhibits a low degree of character assurance. More specifically, characteristic character string whose degree of character assurance is lower than a predetermined threshold level will be eliminated (processing 1700). For the sake of simplicity, the present embodiment eliminates characteristic character strings whose degree of character assurance is not more than 0.5.

FIG. 18 shows that the degree of character assurance of the character "仁" is 0.45, which is lower than 0.5. Therefore, this character is not set as a characteristic character string. Characteristic character strings unnecessary for document retrieval can be eliminated in this manner.

Figure 19:
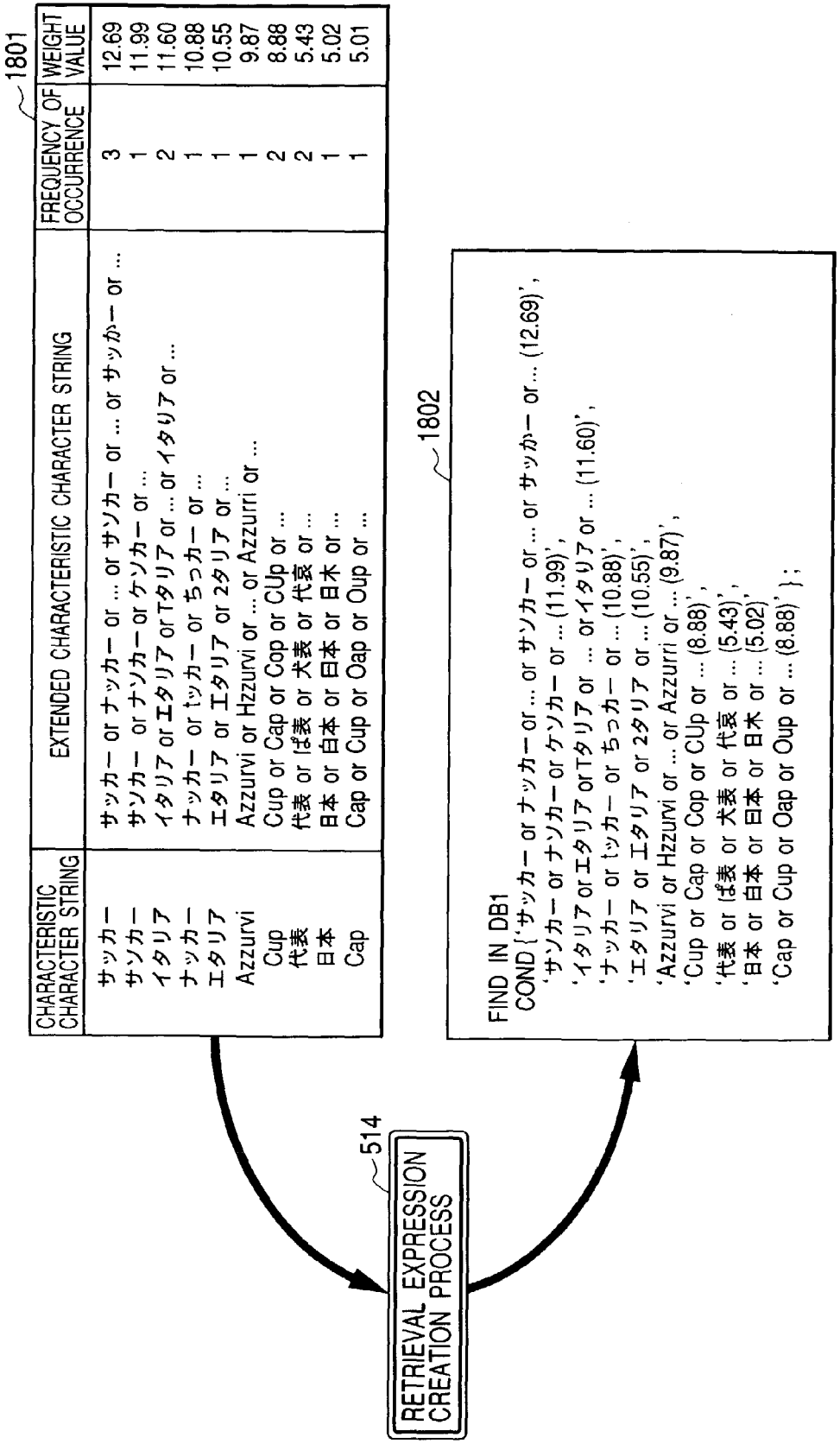
FIG. 19 illustrates an example in which characteristic character strings for retrieval are selected from a seed document to generate a retrieval conditional expression according to the second preferred embodiment.

Table 1801 in FIG. 19 shows the characteristic character strings that are used in the present embodiment for document retrieval purposes. Table 1802 in the same figure shows a retrieval expression generated by the present embodiment. Unlike the characteristic character strings extracted by the first embodiment (table 1203 in FIG. 13), the character string "仁", which is not necessary for document retrieval, is removed from the characteristic character strings shown in Table 1801. It means that characteristic character strings necessary and sufficient for document retrieval can be extracted by the present embodiment. Therefore, the present embodiment solves a problem where a large quantity of unnecessary documents such as the one containing the character string "日本を代表する古墳仁徳大皇陵 . . . (Nintoku Emperor's tomb, a representative Japanese burial mound . . . )" will be unexpectedly retrieved.

As described above, the present embodiment makes it possible to eliminate characteristic character strings that are considered unnecessary for document retrieval. The present embodiment not only offers the advantages provided by the first embodiment but also increases the document retrieval accuracy by eliminating the possibility of extracting unnecessary documents.

As is the case with the first embodiment, the present embodiment can improve the document retrieval accuracy and performance by changing the extended characteristic character string generation method. More specifically, the present embodiment can determine, before steps 506 to 509 in FIG. 15, that is, before the execution of the extended characteristic character string generation program 236 of the present embodiment, whether or not to generate extended characteristic character strings in accordance with the length of an entered retrieval character string, and execute the extended characteristic character string generation program 236 only when such character string generation is to be conducted.

A third embodiment of the present invention will now be described. The third embodiment has the same system configuration as the first embodiment but uses different methods for correcting characteristic character strings and making associated weight value corrections. Therefore, the result of characteristic character string selection for document retrieval by the third embodiment differs from that produced by the first embodiment.

As is the case with the second embodiment, a concrete example of characteristic character strings selected by the first embodiment will now be reviewed (table 1203 in FIG. 13). The character strings "サソカー" and "ナッカー" in Table 1203 are both generated due to erroneous recognition of the character string "サッカー". When the number of characteristic character strings for use in document retrieval is increased, a larger number of documents may be hit; however, it is likely that unnecessary documents may be retrieved as well. The document retrieval accuracy does not significantly increase particularly when characteristic character strings containing recognition errors are used for document retrieval. Further, if unnecessary characteristic character strings are used for document retrieval, the number of retrieval characteristic character strings increases, thereby deteriorating the document retrieval performance.

In the preferred embodiment, character strings containing erroneously recognized characters, such as "サソカー" and "ナッカー", are integrated into a character string containing no erroneously recognized characters (or a character string that is unlikely to contain erroneously recognized characters), such as "サッカー", in order to improve the document retrieval performance and eliminate character strings unnecessary for document retrieval.

Figure 20:
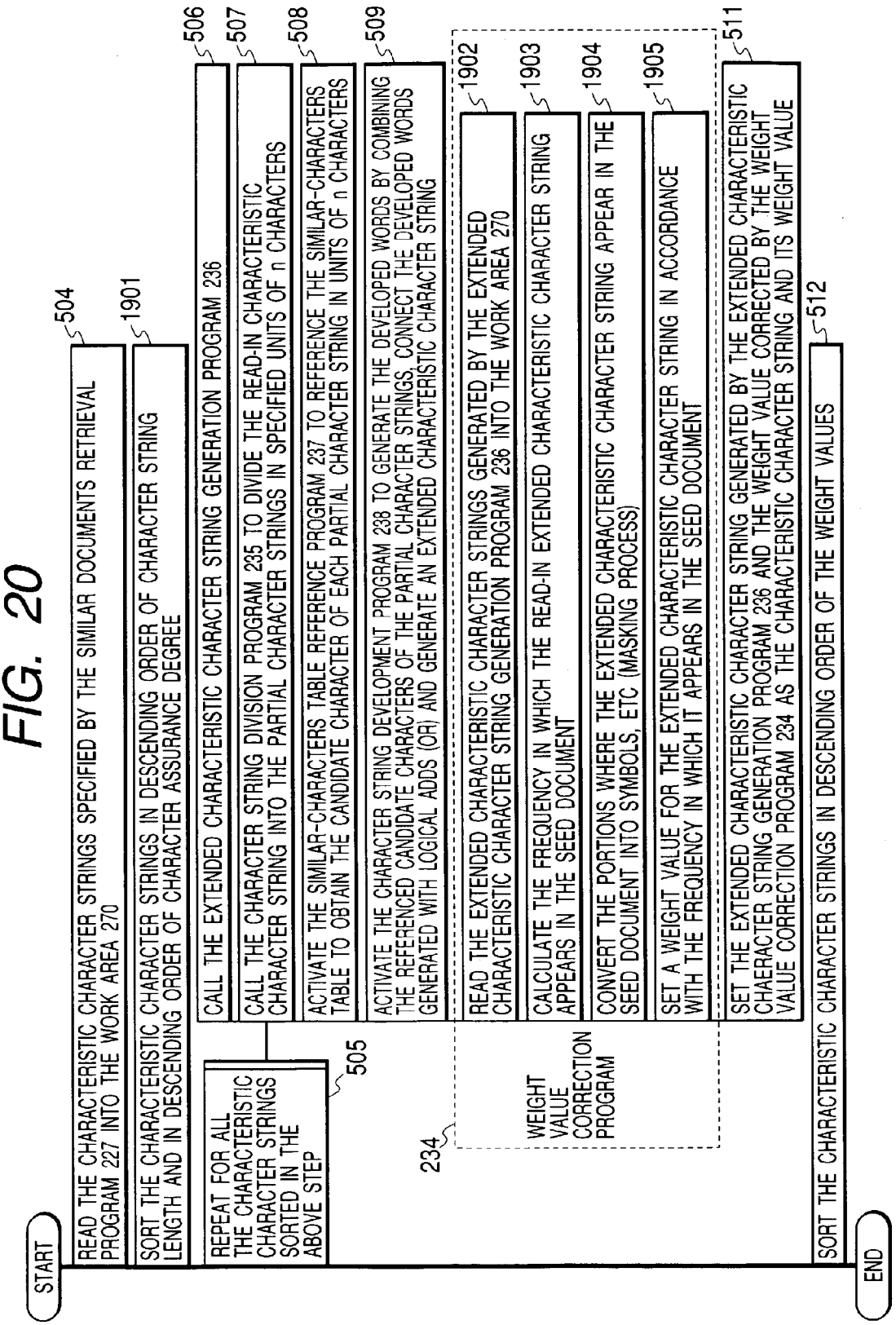
FIG. 20 is a PAD chart that outlines the steps to be performed by a characteristic character string correction program according to a third preferred embodiment.

FIG. 20 is a PAD chart that outlines the process to be performed by the characteristic character string correction program 231 according to the third embodiment. The comparison between the contents of FIG. 20 and the characteristic character string correction program 231 (in FIG. 5) of the first embodiment reveals that the third embodiment performs an additional process (step 1901) to sort generated characteristic character strings in descending order of character string length and in descending order of character assurance before a loop process (step 505) for correcting the weight value for the generated characteristic character string. The third embodiment also differs from the first embodiment in that the former performs a masking process (step 1904) within the weight value correction program 234 to replace extended characteristic character strings with symbols or the like after calculating the frequency of extended characteristic character string occurrence within a seed document.

The document registration process of the third embodiment is the same as that of the first embodiment. The document retrieval process according to the third embodiment of the present invention will now be described using concrete examples.

As is the case with the first embodiment, the third embodiment assumes that the text data 1002 derived from a character recognition process for the paper document 1001 in FIG. 11 is to be set as a seed document. It also assumes that characteristic character strings are extracted from the seed document to generate table 1101 in FIG. 13 as is the case with the first embodiment. The processing steps performed thus far are the same as for the first embodiment.

Figure 21:
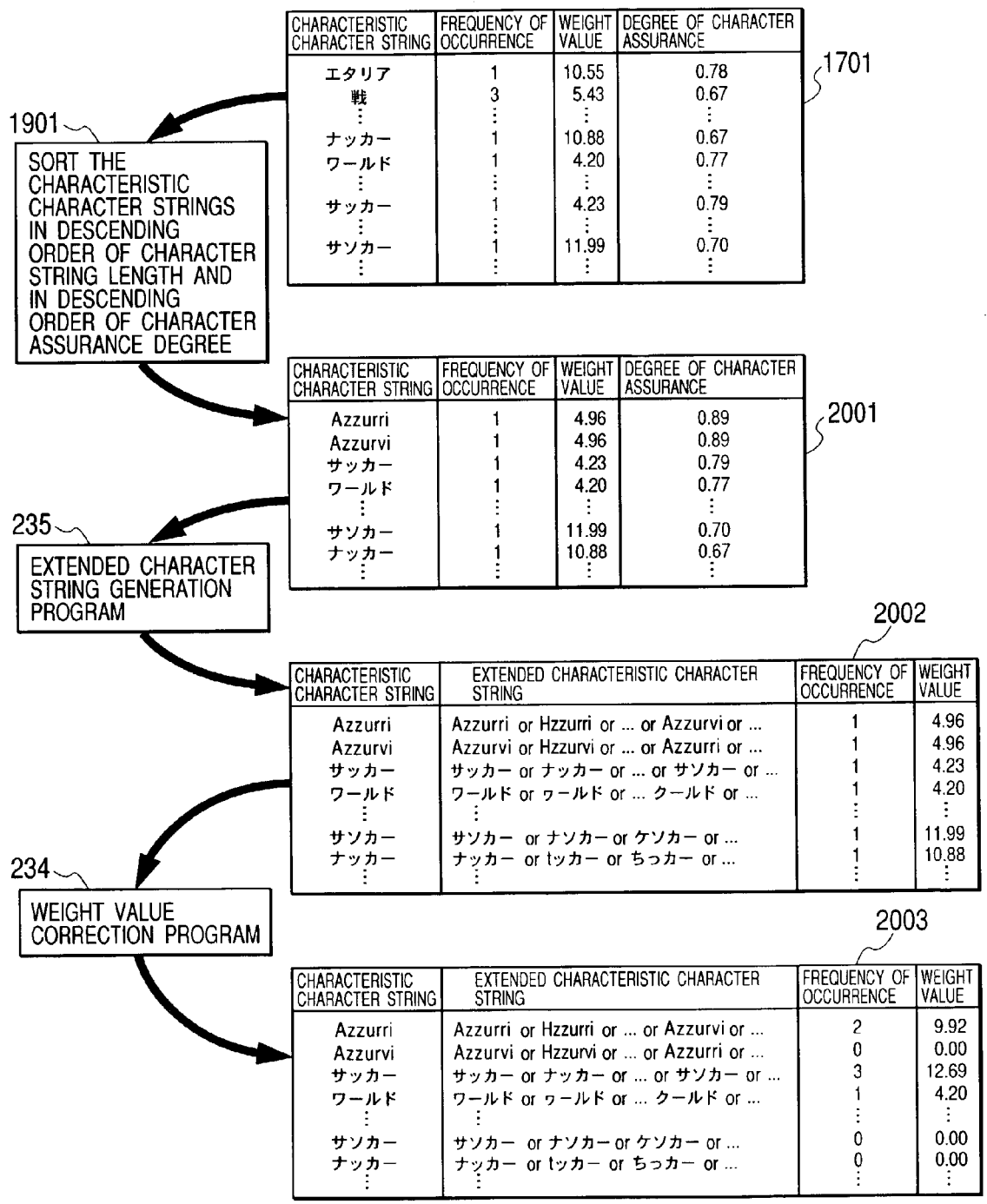
FIG. 21 shows an exemplified weight value correction process that sorts extracted characteristic character strings and masks hit character strings according to the third preferred embodiment.

As a subsequent process, the third embodiment sorts the characteristic character strings existing in table 1101 in descending order of character string length. If the second embodiment is combined with the third one for implementation purposes, the characteristic character strings are also sorted in descending order of character assurance. FIG. 21 shows a concrete example of the above-mentioned sorting process. Although the degree-of-character-assurance data is not entered in table 1101 of the first embodiment, the third embodiment assumes, for the sake of convenience, that the degree-of-character-assurance data is entered in table 1101 due to the combination with the second embodiment (table 1701). Table 2001 in FIG. 21 shows sorted characteristic character strings. These characteristic character strings are sorted in descending order of character string length and in descending order of character assurance, because the third embodiment aims to make use of the fact that the higher the degree of string length and character assurance, the higher the probability of correct character string recognition.

The sorted characteristic character strings are used to perform the same process as for the first embodiment. More specifically, the sorted characteristic character strings are read, one by one, then developed into extended characteristic character strings, and given weight values (weight value correction program 234) to set the characteristic character strings and their weight values.

As indicated in FIG. 21, the weight value correction program 234 reads the extended characteristic character strings in the same manner as in the first embodiment to calculate their frequencies of occurrence within the seed document (steps 1902 and 1903 in FIG. 20).

After completion of step 1903, the third embodiment performs a process that consists of step 1904. In step 1904, the character strings hit by extended characteristic character strings within a seed document are replaced by a symbol (e.g., #, $, or !) that will not be used for document retrieval. This replacement process (hereinafter referred to as the masking process) is performed to ensure that the retrieval process no longer hits character strings that are highly likely to be erroneously recognized.

FIG. 22 shows an exemplified masking process that is performed for the seed document 1002. For the seed document shown in FIG. 22, the similar-characters table 255 is used to develop the character strings (characteristic character strings) "Azzurri" and "サッカー" into extended characteristic character strings and replace the portions hit by the extended characteristic character strings with the character "#". After completion of this process, erroneously recognized character strings, such as "Azzurvi" and "ナッカー", will no longer be hit. Table 2002 in FIG. 21 indicates that the characteristic character strings "Azzurvi", "サソカー", and "ナッカー" occurred once each. After the weight value correction program is executed by the present embodiment, however, the characteristic character strings (table 2003) "Azzurvi", "サソカー", and "ナッカー" do not occur at all. As a result, their weight values are set to 0 so that they will not be used for document retrieval.

Figure 23:
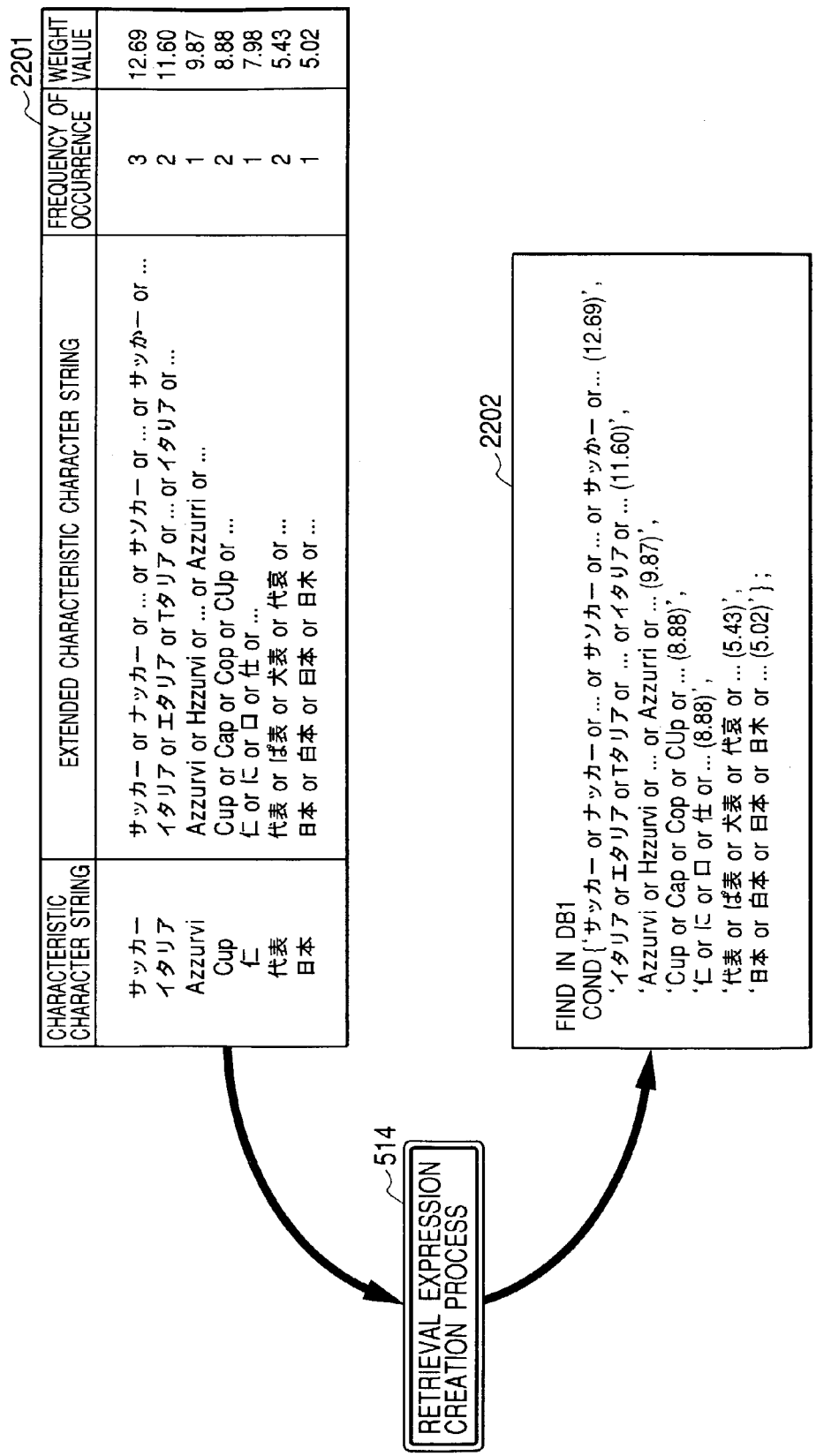
FIG. 23 illustrates an example in which characteristic character strings for retrieval are selected from a seed document to generate a retrieval conditional expression according to the third preferred embodiment.

Table 2201 in FIG. 23 shows characteristic character strings for use in document retrieval that are set by the present embodiment. Table 2202 shows a retrieval expression that is generated by the present embodiment. The comparison with the characteristic character strings extracted by the first embodiment (table 1203 in FIG. 13) reveals that table 2201 does not contain the character strings "サソカー", "ナッカー", "エタリア", and "Cap", which will not possibly be required for document retrieval. Therefore, the process performed by the present embodiment extracts characteristic character strings that are necessary and sufficient for document retrieval, and consequently eliminates character strings that are not required for document retrieval.

As described above, the use of the present embodiment makes it possible to determine character strings into which various characteristic character strings can be integrated. As a result, the present embodiment not only offers the advantages provided by the first embodiment, but also improves the retrieval performance and increases the retrieval accuracy by eliminating characteristic character strings unnecessary for document retrieval.

When the method for eliminating characteristic character strings unnecessary for document retrieval is employed, as is the case with the second embodiment, while using the present embodiment's method for integrating characteristic character strings that can be considered the same, the retrieval accuracy increases because unnecessary documents are excluded from the retrieval result. Further, the present embodiment can also incorporate the step for changing the extended characteristic character string generation method, as is the case with the first embodiment, for document retrieval accuracy enhancement and document retrieval performance improvement. More specifically, the present embodiment can determine, before steps 506 to 509 in FIG. 20, that is, before the execution of the extended characteristic character string generation program 236 of the present embodiment, whether or not to generate extended characteristic character strings in accordance with the length of an entered retrieval character string, and execute the extended characteristic character string generation program 236 only when such character string generation is to be conducted.

The present embodiment uses the characteristic character string correction program 231 at the time of document retrieval to perform a process for correcting characteristic character strings extracted from a seed document. However, the document to be registered can also be regarded as a seed document at the time of document registration to process such a document in the same manner as the characteristic character string correction program 231 of the present embodiment. This processing operation makes it easy to automatically correct erroneously recognized characters of characteristic character strings existing in the document to be registered, thereby raising the character recognition accuracy.

The method for automatically correcting the above-mentioned erroneously recognized characters will now be described in detail. For the purposes of this description and by way of example, it will be assumed that paper document 1001 shown in FIG. 11 represents the document to be registered by the present embodiment, and that document 1002 in FIG. 11 represents the text data obtained by subjecting paper document 1001 in FIG. 11 to character recognition. It will also be assumed that document 1002 in FIG. 11, which is provided for the description of the present embodiment, is regarded as a seed document, and that the character strings in table 2201 in FIG. 23 represent the characteristic character strings extracted by the characteristic character string correction program 231 of the present embodiment.

Character strings that are contained in the extended characteristic character strings and existing within the document to be registered are integrated into the original characteristic character strings. If, for instance, there is the extended characteristic character string "サッカー or ナッカーor . . . or サソカーor . . . or サッかーor . . . ", all the character strings that are contained in the above extended characteristic character string and existing within the document to be registered (e.g., "ナッカー" and "サソカー") can be integrated into the character string "サッカー" so that the character strings "ナッカー" and "サソカー" can automatically be replaced by the character string "サッカー". When the above-mentioned characteristic character string correction program 231 performs this process for all the extracted characteristic character strings, erroneously recognized characters existing in the document to be registered can be batch-corrected automatically or semiautomatically. Further, it is easy to implement the method for using the degree-of-character assurance information, which is used with the second embodiment, and excluding characteristic character strings whose degree of character assurance is lower than a predetermined threshold level from character recognition error automatic correction.

As regards a character recognition error automatic correction method, it is easy to implement a user interface that allows the user to view extracted characteristic character strings, specify the characteristic character strings to be corrected, and correct them at a time. FIG. 24 shows an example of a user interface for the character recognition error automatic correction method. As indicated in FIG. 24, the user interface comprises an area for displaying text data that is derived from character recognition of the document to be registered; setup buttons for specifying whether or not to make automatic corrections; a button for batch correction of selected characteristic character string; check boxes for selecting the characteristic character string to be corrected; text boxes for displaying characteristic character strings extracted from the document to be registered and opening a pull-down menu for listing character strings (derivative character strings) that are likely to arise as erroneously recognized characters for the displayed characteristic character string; and correction buttons for correcting respective characteristic character strings extracted from the document to be registered. When the characteristic character string to be corrected is checked while the user interface shown in FIG. 24 is displayed, the area displaying the document to be registered highlights the character strings that are considered to be the characteristic character strings or their derivatives. Further, a registering user can select a seemingly correct characteristic character string from a pull-down menu and press a correction button for batch correction to use the selected character string in replacement of erroneously recognized derivative character strings in the document to be registered. In addition, a registering user can select a characteristic character string to be batch-corrected and then press a button for batch-correcting the selected character string to correct derivative character strings associated with the selected characteristic character string at a time. Furthermore, if the setup procedures for individual characteristic character string are troublesome, the user can press an automatic correction button to replace individual derivative character strings with displayed characteristic character strings at a time.

Although FIG. 24 indicates the use of setup buttons for specifying whether or not to make automatic corrections, a button for batch correction of selected characteristic character string, check boxes for selecting the characteristic character strings to be corrected, text boxes for displaying characteristic character strings and their derivative character strings, and buttons for correcting the characteristic character strings on an individual basis, an alternative user interface may be used so as to merely display items for checking the characteristic character strings to be corrected and making automatic corrections or display items for specifying whether or not to make automatic corrections.

A fourth preferred embodiment of the present invention will now be described. The fourth embodiment has the same system configuration as the first embodiment but uses a different weight value correction method during a process of the document retrieval server 102.

For weight value correction purposes, the first embodiment calculates the frequencies of characteristic character string occurrence in a seed document and then corrects the calculated frequencies (step 510 in FIG. 5). However, some common similar-documents retrieval systems use not only a parameter representing the frequency of characteristic character string occurrence in a seed document but also a weight setup parameter representing the number of documents targeted for retrieval that contain characteristic character strings. It is probable that these systems may be inadequate for extracting characteristic character strings necessary for document retrieval if they merely correct the frequencies of characteristic character string occurrence in a seed document.

The fourth embodiment not only performs the weight value correction program 234 of the first embodiment but also corrects the number of documents targeted for retrieval that contain characteristic character strings, thereby increasing the weight value correction accuracy.

The document registration process of the present embodiment will not be described herein because it is the same as that of the first embodiment. The document retrieval process according to the fourth embodiment of the present invention will now be described using concrete examples.

As is the case with the first embodiment, the fourth embodiment assumes that the text data 1002 derived from a character recognition process for the paper document 1001 in FIG. 11 is to be set as a seed document. It also assumes, as is the case with the first embodiment, that characteristic character strings indicated in table 1101 in FIG. 13 are extracted, and that the extended characteristic character string generation program 236 generates table 1201 in FIG. 13. The processing steps performed thus far are the same as for the first embodiment.

As a subsequent process, the fourth embodiment performs a weight value correction process as is the case with the first embodiment. However, the weight value correction program performed by the fourth embodiment differs from the first embodiment's weight value correction program (step 510 in FIG. 5) in that the former performs an additional step for calculating the number of documents targeted for retrieval in which extended characteristic character strings appear after calculating the frequencies of extended characteristic character string occurrence in a seed document. The weight value correction program 234 of the fourth embodiment will now be described in detail.

As is the case with the first embodiment, the weight value correction program 234 of the present embodiment reads extended characteristic character strings and calculates the frequencies of their occurrence in a seed document. The extended characteristic character strings are obtained by ORing the developed words. Therefore, if any developed word is contained in the seed document, it can be counted as the frequency-of-occurrence information. When this process is performed, erroneously recognized characters existing in the seed document can be tolerated to correct a parameter related to characteristic character string weight value setup. The processing steps performed thus far are the same as for the first embodiment. However, the present embodiment incorporates an additional step for calculating the frequencies of occurrence of stored extended characteristic character strings in the text file 250, which is a set of documents targeted for retrieval. In this case too, if any developed word is contained in the text file 250, it can be counted as the frequency-of-occurrence information. When this process is performed, erroneously recognized characters existing in the documents targeted for retrieval can be tolerated to correct a parameter related to characteristic character string weight value setup. In accordance with the parameters calculated in the above step, the weight values of extended characteristic character strings are calculated and output. The subsequent processing steps are the same as for the first embodiment.

The process performed by the weight value correction program 234 of the present embodiment, that is, step 510 shown in FIG. 5 has been described in detail.

As described above, when the present embodiment is applied to incorporate an additional step for calculating the number of documents targeted for retrieval that contain extended characteristic character strings, the weight value correction accuracy can be increased to raise the document retrieval accuracy.

Even when the present embodiment's method for correcting the number of documents targeted for retrieval that contain extended characteristic character strings is employed, the method provided by the aforementioned second embodiment for eliminating characteristic character strings irrelevant to document retrieval can be applied to increase the retrieval accuracy because it does not retrieve unnecessary documents. Further, the method for integrating character strings that can be regarded as the same characteristic character strings can be applied, as is the case with the third embodiment, to exclude characteristic character strings unnecessary for document retrieval, thereby enhancing the document retrieval performance and accuracy.

The present embodiment uses the characteristic character string correction program 231 at the time of document retrieval to perform a process for correcting characteristic character strings extracted from a seed document. However, when the third embodiment is applied, the present embodiment can perform a document registration process in which the document to be registered is regarded as a seed document as is the case with the third embodiment's recognition error automatic correction method for the document to be registered. This makes it easy to automatically correct characteristic character string recognition errors in the document to be registered, thereby increasing the character recognition accuracy.

Further, the present embodiment can also incorporate the step for changing the extended characteristic character string generation method, as is the case with the first embodiment, for document retrieval accuracy enhancement and document retrieval performance improvement. More specifically, the present embodiment can determine, before steps 506 to 509 in FIG. 5, that is, before the execution of the extended characteristic character string generation program 236 of the present embodiment, whether or not to generate extended characteristic character strings in accordance with the length of an entered retrieval character string, and execute the extended characteristic character string generation program 236 only when such character string generation is to be conducted.

As described above, document registration can be completed simply by registering image data that is generated by reading the document to be registered with a scanner or like device and registering text data that is derived from character recognition of image data. Further, this registration process is performed by the system. Therefore, the user can register a document merely by presenting it. When the present invention is applied, erroneously recognized characters in the document to be registered can be batch-corrected to reduce the burden on the user.

Further, when a retrieval process is to be performed on registered documents, the user simply has to set the original document for use in similar-documents retrieval as a seed document. This causes the system to separately perform a process for correcting characteristic character strings extracted from the seed document and a process for tolerating erroneously recognized characters existing in the documents targeted for retrieval. As a result, highly accurate similar-documents retrieval can be conducted without the user having to be aware of characteristic character string recognition errors existing in either or both of the seed document and the documents targeted for retrieval.

What is claimed is:

1. A document retrieval method for use in a retrieval system where a document database in which either prepared text data or text data extracted from image documents by a character recognition process is registered is searched to retrieve documents similar in content to a document specified by a retriever, the method comprising:
   a partial character string extraction step for extracting one or more partial character strings from said document specified by said retriever;
   a retrieval character string correction step for performing a character string correction process on said partial character strings obtained in said partial character string extraction step in order to correct recognition errors;
   a recognition error tolerance/retrieval step for retrieving documents, including candidate transcriptions that may arise due to recognition error, in accordance with retrieval character strings derived from said retrieval character string correction step; and
   a similarity calculation step for calculating the degree of similarity to the document specified by the retriever using the frequency-of-occurrence information about retrieval character strings in the documents that are extracted from said database in said recognition error tolerance/retrieval step.

2. The document retrieval method according to claim 1, wherein said retrieval character string correction step comprises:
   a partial character string development step for generating candidate transcriptions, which may arise due to recognition error, in accordance with the partial character strings obtained in said partial character string extraction step; and
   a frequency-of-occurrence correction step for correcting the frequencies of occurrence within said document specified by said retriever in accordance with the frequencies of occurrence of the partial character strings generated in said partial character string development step.

3. The document retrieval method according to claim 2, wherein said frequency-of-occurrence correction step corrects the frequency of occurrence of at least one of the partial character strings generated in said partial character string development step.

4. The document retrieval method according to claim 1, wherein said retrieval character string correction step comprises:
   a degree-of-character-assurance calculation step for referencing prepared degree-of-character-assurance information and calculating the degree of character assurance of retrieval character strings; and
   a retrieval character string exclusion step for removing retrieval character strings whose degree of character assurance, which is calculated in said degree-of-character-assurance calculation step, is lower than a predetermined threshold level.

5. The document retrieval method according to claim 1, wherein said retrieval character string correction step further comprises:
   a partial character string development step for generating candidate transcriptions, which may arise due to recognition error, in accordance with the partial character strings obtained in said partial character string extraction step;
   an intra-database frequency-of-occurrence extraction step for determining the frequencies of occurrence of developed partial character strings in a database targeted for document retrieval; and
   a retrieval partial character string selection step for selecting partial character strings for use in document retrieval in accordance with the intra-database frequency-of-occurrence information obtained in said intra-database frequency-of-occurrence extraction step.

6. The document retrieval method according to claim 1, wherein said retrieval character string correction step further comprises:
   a partial character string development step for generating candidate transcriptions, which may arise due to recognition error, in accordance with the partial character strings obtained in said partial character string extraction step; and
   an intra-database frequency-of-occurrence extraction step for determining the frequencies of occurrence of said generated partial character strings in a database targeted for document retrieval; and
   wherein said similarity calculation step calculates the degree of similarity in accordance with the intra-database frequency-of-occurrence information obtained in said intra-database frequency-of-occurrence extraction step.

7. The document retrieval method according to claim 1, wherein said document specified by said retriever comprises at least one of a document preregistered in a database, a document text-derived from a character recognition process performed on an image document that is obtained by scanning a paper document at the time of retrieval, and a document retrieval text that is entered by the retriever at the time of retrieval.

8. The document retrieval method according to claim 1, further comprising an interface for specifying, at the time of document retrieval, the information as to whether or not to execute the retrieval character string correction step for correcting retrieval character strings extracted from said document specified by said retriever.

9. The document retrieval method according to claim 8, wherein the information as to whether said document specified by the retriever is a document preregistered in a database, a document text-derived from a character recognition process performed on an image document that is obtained by scanning a paper document at the time of retrieval, or a document retrieval text that is entered by the retriever is used to determine whether or not to execute the retrieval character string correction step for correcting retrieval character strings extracted from said document specified by the retriever.

10. A character recognition method for extracting recognition result text by performing a character recognition process on image data, the method comprising:
   a partial character string extraction step for extracting specified partial character strings from said recognition result text;
   a partial character string development step for generating candidate transcriptions, which may arise due to recognition error, in accordance with the partial character strings obtained in said partial character string extraction step; and
   a recognition result text correction step for correcting the partial character strings in said recognition result text in accordance with information about the frequencies of occurrence of partial character strings, which are obtained in said partial character string development step, within said recognition result text.

11. The character recognition method according to claim 10, wherein said recognition result text correction step selects character strings whose frequency of occurrence is higher than a predetermined threshold level as a correction process target.

12. The character recognition method according to claim 10, further comprising an interface for setting the threshold value information for determining whether or not to execute the step for correcting partial character strings within said recognition result text in accordance with the frequency-of-occurrence information about the partial character strings obtained in said partial character extraction step.

13. The character recognition method according to claim 10, further comprising an interface for displaying the partial character strings obtained in said partial character string extraction step in such a manner as to let a registerer discern the partial character strings within said recognition result text and batch-correcting said character strings upon instruction from the registerer by replacing the partial character strings with character strings specified by the registerer.

14. A document retrieval system for retrieving relevant documents from a document database in which a plurality of documents are registered, the system comprising:
  a document registration subsystem for reading images of documents targeted for retrieval during a character recognition process and registering the images as document data;
  a retrieval client for reading document data from documents for use in retrieval and transmitting a retrieval command; and
  a document retrieval server for receiving the retrieval command and searching the document data registered by the document registration subsystem to retrieve documents in accordance with said document data of documents for use in said retrieval;
  wherein said document retriever server corrects erroneously recognized characters existing in said documents to be registered, and tolerates erroneously recognized characters existing in said documents targeted for retrieval.

15. The document retrieval system according to claim 14, wherein said document retrieval server first eliminates characteristic character strings unnecessary for document retrieval from characteristic character strings extracted from said documents targeted for retrieval, and then retrieves relevant documents.

16. A document retrieval server for retrieving relevant documents from a plurality of documents, the server comprising:
  a storage device for storing a document database retaining text data that is read from documents targeted for retrieval by performing a character recognition process;
  a communication controller for receiving document data of documents for use in retrieval;
  a processor for retrieving relevant documents from said document database in accordance with the received document data; and
  a memory for storing a program that operates said processor to perform processing, the memory including:
  a code for correcting erroneously recognized characters in the documents for use in said retrieval; and
  a code for tolerating erroneously recognized characters existing in the documents targeted for said retrieval.

17. The document retrieval server according to claim 16, wherein said code for correcting erroneously recognized characters in the documents for use in the retrieval further comprises:
  a code for extracting characteristic character strings from character strings in the documents for use in said retrieval;
  a code for correcting said characteristic character strings and their weight values; and
  a code for selecting characteristic character strings for use in actual retrieval from the corrected characteristic character strings; and
  wherein said code for tolerating erroneously recognized characters existing in the documents targeted for retrieval further comprises:
  a code for selecting recognition-error-prone candidate characters from said selected characteristic character strings and referencing characters similar to the candidate characters from a similar-characters table stored in said storage device; and
  a code for developing characteristic character strings by combining the referenced candidate characters.

18. The document retrieval server according to claim 17, wherein said memory further includes a code for removing characteristic character strings unnecessary for document retrieval from said extracted characteristic character strings.

19. A document retrieval server for retrieving relevant documents from a plurality of documents, the server comprising:
  a first storage means for storing text data that is read from a plurality of documents targeted for retrieval during a character recognition process;
  a processing means for searching a plurality of documents stored by said first storage means to retrieve relevant documents; and
  a second storage means for storing a program executed by said processing means;
  wherein said second storage means includes:
  a code for extracting characteristic character strings from documents stored by said first storage means;
  a code for correcting the characteristic character strings including erroneously recognized characters;
  a code for selecting characteristic character strings for use in document retrieval from the corrected characteristic character strings;
  a code for checking said selected characteristic character strings to enumerate recognition-error-prone characters as candidate characters;
  a code for referencing candidate characters similar to the enumerated candidate characters and combining said selected characteristic character strings with the referenced candidate characters to develop characteristic character strings; and
  a code for retrieving documents in accordance with the developed characteristic character strings.

20. A computer program product that is stored on a computer-readable storage medium for use in a document retrieval system for searching a plurality of preregistered documents to retrieve documents related to a retriever-specified document, the program product comprising:
  a code for extracting one or more partial character strings from a document specified by said retriever;
  a code for performing a recognition error correction process on the extracted partial character strings;

a code for retrieving documents, including candidate transcriptions that may arise due to recognition error, in accordance with retrieval character strings derived from the correction process; and a code for calculating the degree of similarity to the document for use in said retrieval, which is received by a communication controller, in accordance with the frequency-of-occurrence information about the retrieval character strings extracted by the retrieval.

21. The computer program product according to claim 20, wherein said code for performing a recognition error correction process on said extracted partial character strings further comprises:

a code for referencing prepared degree-of-character-assurance information to calculate the degree of assurance of retrieval character strings; and a code for excluding retrieval character strings whose calculated degree of character assurance is lower than a predetermined threshold level.

* * * * *